United States Patent [19]
Ito et al.

[11] Patent Number: 6,108,033
[45] Date of Patent: Aug. 22, 2000

[54] METHOD AND SYSTEM MONITORING VIDEO IMAGE BY UPDATING TEMPLATE IMAGE

[75] Inventors: Wataru Ito, Kodaira; Hirotada Ueda, Kokubunji; Toshimichi Okada, Zama, all of Japan

[73] Assignee: Hitachi Denshi Kabushiki Kaisha, Tokyo, Japan

[21] Appl. No.: 08/862,918

[22] Filed: May 23, 1997

[30] Foreign Application Priority Data

May 31, 1996 [JP] Japan ..................................... 8-138913

[51] Int. Cl.⁷ ................................................ H04N 7/18
[52] U.S. Cl. ........................................... 348/152; 348/172
[58] Field of Search ..................... 348/135, 169, 348/172, 214, 152; 382/103, 209, 216; H04N 7/18

[56] References Cited

U.S. PATENT DOCUMENTS

| | | | |
|---|---|---|---|
| 4,737,847 | 4/1988 | Araki | 348/161 |
| 5,204,749 | 4/1993 | Toyama | 358/227 |
| 5,554,983 | 9/1996 | Kitamura | 340/937 |
| 5,809,171 | 9/1998 | Neff | 382/209 |
| 5,867,584 | 2/1999 | Hu | 382/103 |

OTHER PUBLICATIONS

Traffic Flow Congetion Measuring System by Image Porcessing, T. Kitamura et al., Papers of Second Image Sensing Synmposium Lectures, May 1996.
Inroduction of Computer Image Processing, Tamura, May 1995.

Primary Examiner—Young Lee
Attorney, Agent, or Firm—Antonelli, Terry, Stout & Kraus, LLP

[57] ABSTRACT

A difference between an input image including images of a background image picked up by an image pick-up unit and an object to be monitored is produced as an image of the object, the image of the object is divided into a plurality of parts and the plurality of divided image of the object are produced as a plurality of templates. Each of the plurality of templates is matched with a new input image and images of a plurality of parts in the new input image which have highest degrees of matching with the plurality of templates are used to update the plurality of templates to output a plurality of new templates. Each of the plurality of new templates is matched with a further new input image and images of a plurality of parts in the further new input image which have highest degrees of matching with the plurality of new templates are used to update the plurality of new templates to output a plurality of further new templates. In this manner, the plurality of templates are sequentially updated for the new input images to trace the object.

13 Claims, 20 Drawing Sheets

701

702

701
703
702
Δy 702
704
Δy
701

705

METHOD AND SYSTEM MONITORING VIDEO IMAGE BY UPDATING TEMPLATE IMAGE

BACKGROUND OF THE INVENTION

The present invention relates to a video image monitoring method and system for monitoring an object in an image picked up by a television camera. More particularly, the present invention relates to video image monitoring method and system for automatically detecting an object which intrudes in a view field of image pick-up of the television camera, from a video signal of the television camera and automatically tracing the object when the object moves.

A video image monitoring apparatus using a television camera (hereinafter referred to as a TV) has been widely used from the past. Recently, a system which automatically detects a moving object such as a human or an automobile which intrudes into a monitoring view field of such a system, from an image signal and reports or alarms under a predetermined condition, instead of detecting and tracing it by human on a monitor screen has recently been demanded.

In order to implement such a system, an input image derived from the TV camera and a previously inputted reference background image, that is, an image in which an object to be detected is not picked up are compared for each of corresponding pixels, and a intensity difference is determined for each pixel. Then, a pixel area having large difference is detected as an object image. This method is called a differential method and has been widely used from the past.

An application of the differential method is disclosed in U.S. patent application Ser. No. 08/646018 filed on May 7, 1996 based on JP-A-7-230301.

Referring to FIGS. 1A~1E, a process by the differential method is explained. First, an input image 601 (FIG. 1A) derived from a TV camera and a previously inputted reference background image 602 (FIG. 1B) are compared for each of corresponding pixels to determine an intensity difference for each pixel. Assuming that one pixel comprises eight bits, a binarized image 603 is produced by setting an intensity value of a pixel having the intensity difference which is smaller than a predetermined threshold to 0 (all of the eight bits are "0"), and the intensity value of a pixel having the intensity difference which is not smaller than the threshold to 255 (all of the eight bits are "1"). In FIG. 1A, numeral 500 denotes an area to be monitored and it is assumed here that the entire screen area is the area to be monitored. Numeral 504 denotes a gate, numeral 506 denotes a fence, numeral 502 denotes an off-limit area, numeral 508 denotes a line indicating a border of the off-limit area and numeral 510 denotes an object to be monitored, for example, human. Accordingly, in the binarized image 603, an image 510 of the human picked up in the input image 601 is detected as an image 604.

Automatic tracing of the detected object is conducted by serially detecting the object by the differential method for the sequentially inputted image and determining movement of the object based on positions of the object at respective detection times. For example, in the binarized image 605 of FIG. 1D, it is assumed that the object is detected by an image 606 at a time t0-2, by an image 607 at a time t0-1 and by an image 608 at a time t0. The movement of the object is represented by arrows 613 and 614 which connect centers of gravity 609, 610 and 611 of the binarized images 606, 607 and 608 at the respective times (see image 612 of centers of gravity shown in FIG. 1E).

The center of gravity may be determined by the following formula (1).

$$C = (\hat{x}, \hat{y}) \quad (1)$$
$$\hat{x} = \frac{1}{[B]} \sum_{(x,y) \in B} x$$
$$\hat{y} = \frac{1}{[B]} \sum_{(x,y) \in B} y$$
$$B = [(x, y) | f(x, y) = 255]$$

where $C=(\hat{x}, \hat{y})$ is a center of gravity, $f(x, y)$ is a binarized image of the difference (255 when not smaller than the threshold and 0 when smaller than the threshold), and $[B]$ is the number of pixels which makes $f(x, y)=255$.

A center of gravity by a secondary moment may be considered and any other method may be used so long as the binarized area can be represented by one coordinate.

In the tracing method of the object using such a differential method, since a view field is changed when a pick-up direction of the TV camera or a zoom ratio is changed so that a previously prepared background image can no longer be used, it is not possible to stably detect the object. Even if the presence of object is detected, the shape of the detected object is not compared at each time. Accordingly, it is not guaranteed that the detected object is absolutely the same object and that the object being traced is absolutely the same object. Accordingly, when a plurality of objects are present in the view field and the respective objects are detected and traced, stable tracing is not attained.

A known common template (fixed image) matching is now explained. For example, in the prior art pattern matching technique represented by a printed board test machine, a template is previously registered and (1) a portion of an image of the printed board to be tested which has a high degree of matching is detected (and a position of the printed board is corrected). Further, (2) the object is evaluated (detection of presence or absence of break) in accordance with the degree of matching. This is briefly explained with reference to FIG. 2.

In an example of FIG. 2, as shown by a template group 15 having parts "A", "B", "C" and "D" registered therein is previously registered, and the pattern matching is conducted in each of images 141, 142 and 143 to be evaluated to examine the states of the respective parts. The image 141 under evaluation is determined as normal. For the image 142 under evaluation, the part "C" is positionally deviated (it matches at a deviated position from a normal position), and the part "D" is determined as lacked (no matching in the image). For the image 143 under evaluation, the part "C" is determined to have break or print condition of the package is not good 0(low degree of matching). However, in this matching method, only the template of the registered parts can be evaluated. Namely, since the fixed template is used, correct defemination cannot be made when an apparent size of the part changes (for example, a distance between an image pick-up device and the part changes).

Accordingly, when this method is applied to trace an automobile, the template for all types of automobiles present in the world must be prepared.

In the differential method widely used from the past, when the view field of the camera or the zoom ratio is changed, the previously prepared background and the actually inputted background image are different as described above. In this case, when the difference is computed, the deference occurs in the background area and the detection of the object by the binarization is not attained. Namely, when the apparent size of the object changes, correct determination cannot be attained. Even hen the view field of the camera is fixed, if a plurality of objects are picked up in the view field, the shapes of the objects should be compared to determine whether the object currently being traced is same as the traced object at a different time in order to specify the currently traced object from those objects.

In the differential process, a technique to sequentially update the image of the template to the latest input image has been proposed. Such a technique is disclosed in "Traffic Flow and Congestion Measuring System by Image Processing", T. Kitamura et al., Papers of Second Image Sensing Symposium Lectures, May 1996, pp.293~296.

However, in such a method of updating the template, the object cannot be precisely traced when an apparent size of the object, that is, the size of the object on the screen changed by a change of a distance between the TV camera and the object or a change in the zoom ratio of the TV camera.

SUMMARY OF THE INVENTION

It is an object of the present invention to provide video image monitoring method and system which solves the above problems encountered in the prior art.

It is another object of the present invention to provide highly reliable video image monitoring method and system which can stably detect a position of the object to be monitored, a distance of movement of the object and a distance between the TV camera and the object.

It is other object of the present invention to provide video image monitoring method and system which assure the tracing of the same object under tracing even if the view field of the TV camera or the zoom ratio is changed.

It is a further object of the present invention to provide a display method of the object to be monitored which assures to an operator the positive and ready tracking of the object to be monitored.

In accordance with one aspect of the present invention, there is provided a video image monitoring method for monitoring an object to be monitored picked up by an image pick-up unit, including a first step for producing a difference between an input image including a background image and an image of the object to be monitored from said image pick-up unit and the background image, as an image of the object; a second step for dividing the image of the object into a plurality of parts to produce a plurality of divided images of the object as a plurality of templates, a third step for matching each of a plurality of templates with a new input image and detecting a plurality of parts of the new input image having highest degrees of matching with the templates and a fourth step for updating the new templates using the parts of the new input image having the highest degrees of matching as a plurality of new templates. The fourth step is sequentially executed for new input images to sequentially update the templates to trace the object.

In accordance with the above aspect of the present invention, the template is divided into a plurality of parts and the plurality of divided templates are sequentially updated in accordance with the input image. Thus, exact and stable tracing of the object is attained even when the apparent shape, size or orientation of the object to be monitored changes.

In accordance with one embodiment of the present invention, the fourth step includes a step for determining a difference of coordinates on the further new input image between the images of the plurality of parts derived in the fourth step and the plurality of new templates as a distance of movement of the object to be monitored, a step for determining a change amount of the distances between the plurality of new templates in the further new input image and the images of the plurality of parts derived in the third or fourth step, relative to the desistance between the plurality of new templates, and a step for adding the distance of movement to the coordinates of the plurality of new templates to determine the positions of the plurality of further new templates and updating the sizes of the plurality of new templates based on the change amount to produce the plurality of further new templates.

Thus, even when the apparent size of the object to be monitored changes, exact and stable tracing of the object is attained.

In accordance with another embodiment of the present invention, the method further includes a fifth step for determining the distance between the object to be monitored and the image pick-up means in accordance with the change amount derived in said fourth step and a sixth step for controlling a zoom ratio of the image pick-up means in accordance with the distance between the object to be monitored and the image pick-up means derived in said fifth step.

Thus, even when the apparent size of the object to be monitored picked up by the image pick-up unit changes, the size of the picked-up image of the object may be automatically corrected to substantially constant size and the exact and stable tracing of the object is attained.

In accordance with other example of the present invention, the method further includes a seventh step for displaying at least one of frames of the plurality of further new templates updated in said fourth step and the images of the plurality of parts derived in said fourth step on a display screen.

Thus, the operator may readily, correctly and stably recognize the object to be monitored on the display screen.

DESCRIPTION OF THE PREFERRED EMBODIMENTS

Figure 1A:
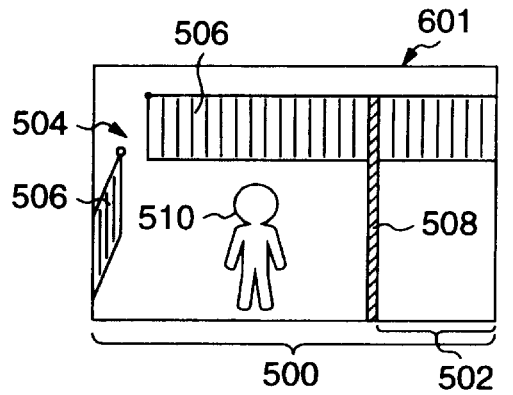
FIGS. 1A~1E illustrate a tracing method of an object to be monitored by a prior art differential method.
Figure 1B:
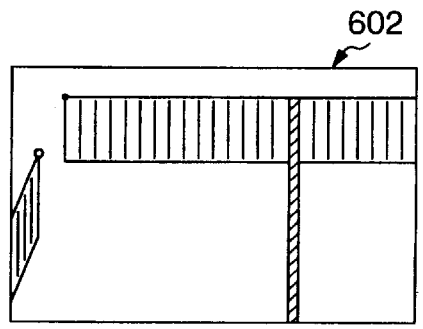
Figure 1C:
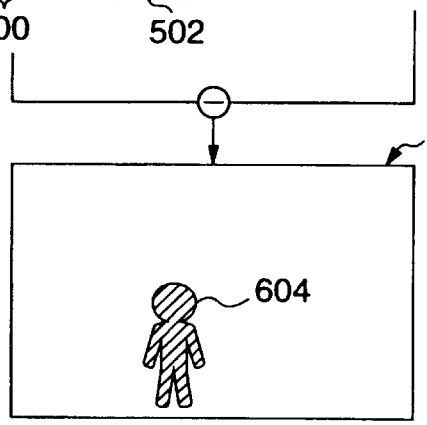
Figure 1D:
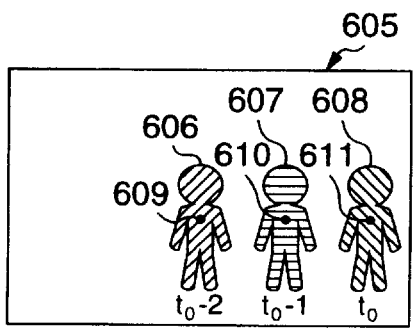
Figure 1E:
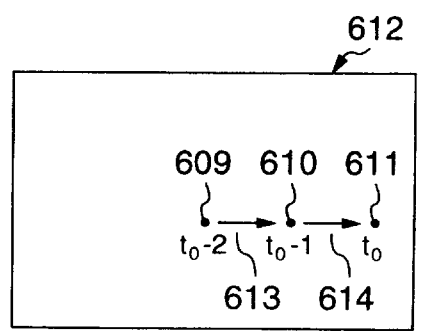
Figure 2:
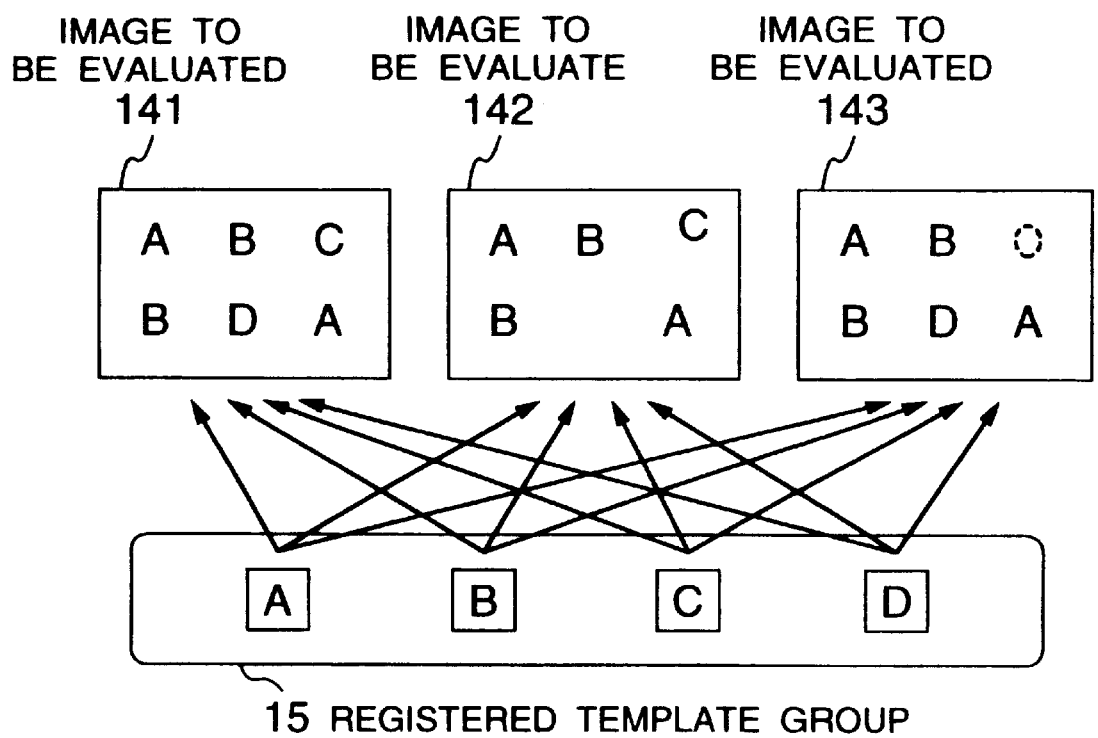
FIG. 2 illustrates prior art template matching.

Before the present invention is explained, the video image monitoring technique which is the background of the present invention is explained.

In the following description, the elements having the same functions are designated by the same reference numerals.

In the background technique of the present invention, an input image signal derived from a TV camera and a reference background image, that is, an image signal in which an object to be detected is not picked up are compared, an intensity difference is determined for each pixel, and an area having the difference larger than a predetermined value is detected as an image of the object to be monitored. Then the image of the area of the detected object to be monitored is registered as a template and a process to detect an image having a highest degree of matching to the template from the input image signal derived from the TV camera at another time, that is, template matching is conducted to determine where in the input image signal the detected image is present to trace the object to be monitored.

Figure 3:
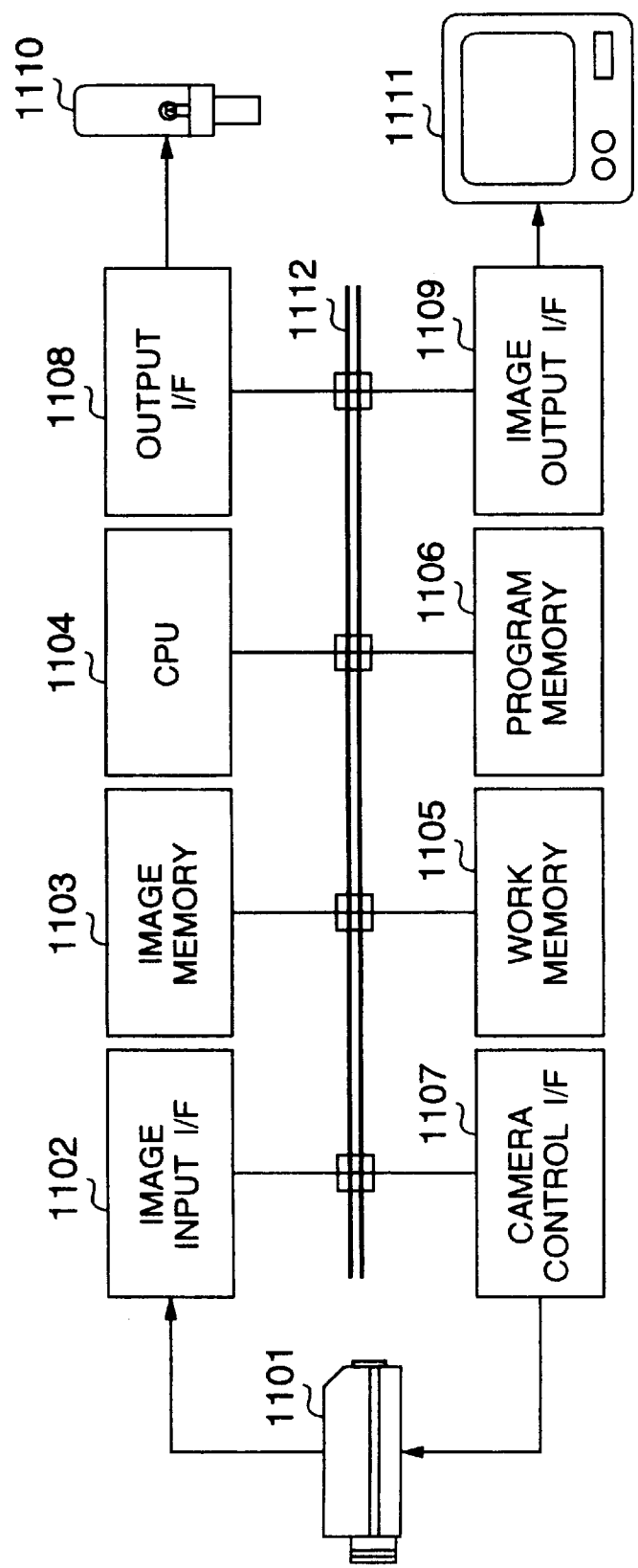
FIG. 3 shows a block diagram of a configuration of a video image monitoring system of the present invention.

FIG. 3 shows a hardware configuration of a video image monitoring system which is substantially common to the background technique of the present invention and the respective embodiments.

In FIG. 3, an image pick-up device such as a TV camera 1101 picks up an area to be monitored. An image signal from the TV camera is subjected to a process such as analog/digital conversion by an image input interface (I/F) 1102 and it is temporarily stored in an image memory 1103 through a data bus 1112. A processor or a CPU 1104 conducts image analysis in a work memory by using the input image and the template image in the image memory 1103 in accordance with a program stored in a program memory 1106 such as a ROM. Further, the CPU 1104 applies a camera control signal to a camera control I/F 1107 in accordance with the analyzed image and the camera control I/F responds thereto to control the TV camera. For example, it detects the object to be monitored and the position thereof and controls the position of the TV camera in accordance with the distance of movement of the detected object so that the object to be monitored is positioned in the view field of the camera, that is, to allow continuous tracing of the detected object. In first to fourth embodiments to be described later, however, the area to be monitored is fixed and the position control of the camera is not conducted. A monitor 1111 displays, for example, the input image sent through the image input interface (I/F) 1102, a data bus 1112 and an image output I/F 1109. The CPU 1104 sequentially generates new templates based on the input image and the reference template, supplies the generated template to the image output I/F 1109 through the bus 1112, displays it on the monitor 1111 together with the input image so that the operator can readily monitor the object to be monitored on the monitor.

In an embodiment of the present invention, an output I/F 1108 and an alarm device such as an alarm lamp 1110 are further provided, and when the CPU 1104 detects that the object to be monitored intrudes into an off-limit area, for example, it applies a control signal to the output I/F 1108 through the bus 1112 to turn on the alarm lamp 1110. In this case, the CPU may apply the control signal to the image output I/F 1109 through the bus 1112 to display the alarm on the monitor 1111.

Figure 4:
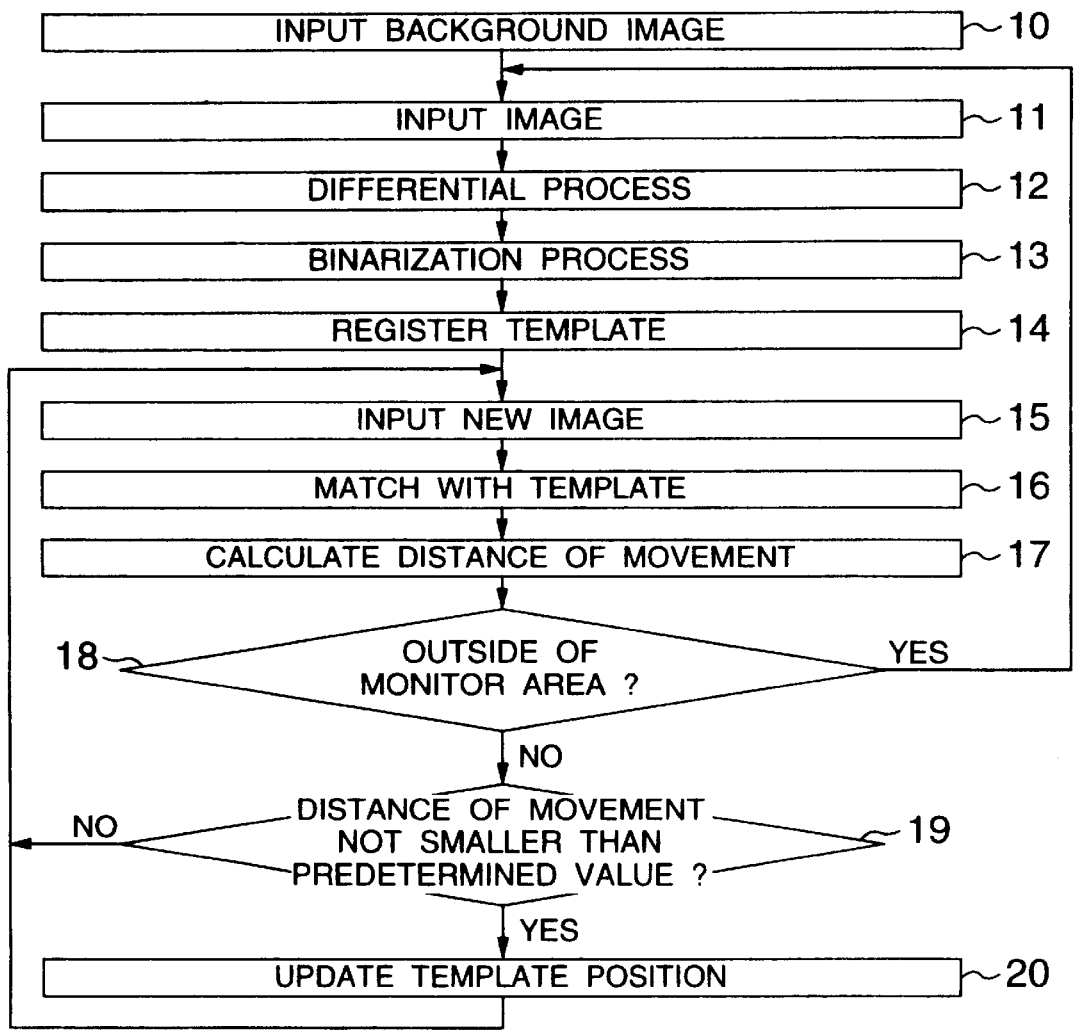
FIG. 4 shows a flow chart for illustrating a video image monitoring method by a background technique of the present invention.

FIG. 4 shows a flow chart of the background technique of the present invention. Steps of FIG. 4 are explained with reference to FIGS. 5A–5G.

Figure 5A:
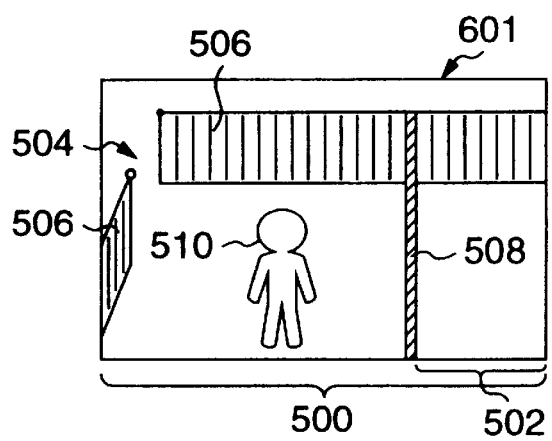
FIGS. 5A~5G illustrate a video image monitoring method by the background technique of the present invention shown in FIG. 4, FIGS. 6A~6E illustrate template matching by the background technique of the present invention.
Figure 5B:
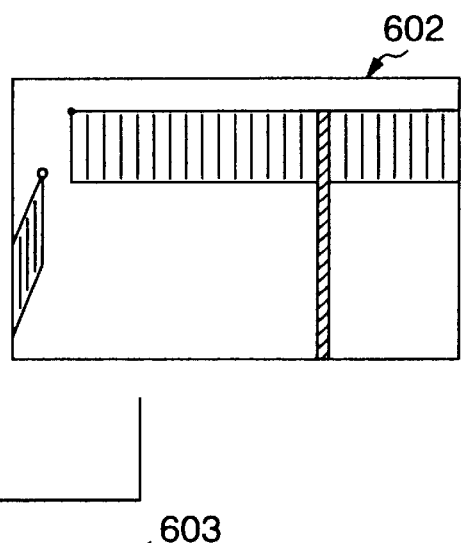
Figure 5C:
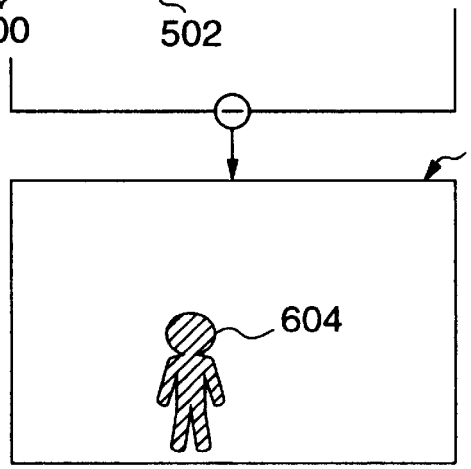
Figure 5D:
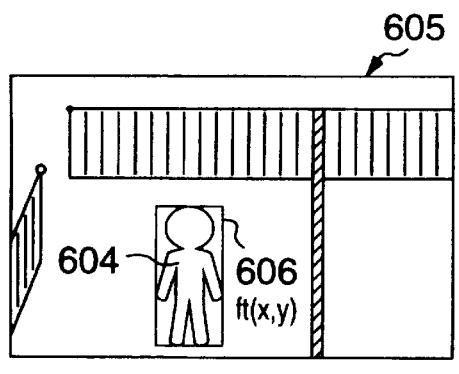
Figure 5E:
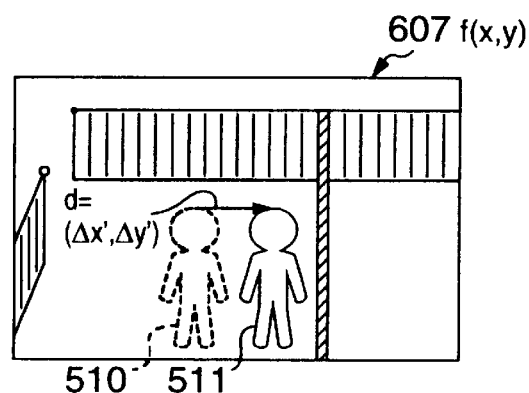

First, in a step 10, a background image 602 (FIG. 5B) comprising 320×240 pixels in which the object to be monitored, for example, a human 510 in FIG. 5A is not present is picked up by the TV camera 1101 and it is stored in the image memory 1103 through the image input I/F 1102 and the bus 1112. Then, in an image input step 11, an input image signal 601 (FIG. 5A) corresponding to the 320×240 pixels is derived from the TV camera 1101. Then, in a differential process step 12, it is compared with the previously registered background image 602 in which the object to be detected is not picked up for each corresponding pixel to produce an intensity difference for each pixel. Then, in a binarization process step 13, the difference value obtained in the differential process step 12 is processed by a threshold. Namely, assuming that one pixel comprises eight bits, the intensity value of the pixel having the difference value not larger than a predetermined threshold (that is, the pixel at which the object to be monitored is not present) is set to 0 (all of the eight bits are "0") and the intensity value of the pixel having the difference value larger than the threshold (that is, the pixel at which the object to be monitored is present) is set to 255 (all of the eight bits are "1") to produce a binarized image 603. Accordingly, in the binarized image 603, the image 510 of the object (human) to be monitored which is picked up in the input image 601 is detected as an image 604 (FIG. 5C). The predetermined threshold value may be a fixed value or a variable determined by an image pick-up condition.

Then, in a template registration step 14, an image of an area which circumscribes the detected image 604 in the input image 605 (FIG. 5D) (the same image as the input image 601) in the step 11, for example, a rectangle and preferably a rectangular area 606 which circumscribes the detected image 604 is registered in the image memory 1103 as the template. This template image is defined herein as $f_t(x, y)$ where x and y indicate coordinates of horizontal and vertical scan direction of the pixels in the template image on the input image 605.

Then, in a step 15, like in the step 11, a new input image signal 607 (FIG. 5E) of the 320~240 pixels is inputted. (The new image is defied as ft(x, y)). Numeral 511 denotes an image of the object to be monitored in the input image. Then, in a template matching process step 16, a portion 620 (FIG. 5G) having a highest degree of matching (correlation) with the template f(x, y) 606 registered in the step 14, in the new input image f(x, y) of the step 15 is determined based on a formula (2):

$$r(\Delta x, \Delta y) = \frac{N \sum_{(x,y) \in B} f_t(x, y) f(x + \Delta x, y + \Delta y) - \sum_{(x,y) \in B} f_t(x, y) \sum_{(x,y) \in B} f(x + \Delta x, y + \Delta x)}{\sqrt{N \sum_{(x,y) \in B} f_t(x, y)^2 - \left[\sum_{(x,y) \in B} f_t(x, y)\right]^2} \sqrt{N \sum_{(x,y) \in B} f(x + \Delta x, y + \Delta y)^2 - \left[\sum_{(x,y) \in B} f(x + \Delta x, y + \Delta y)\right]^2}} \quad (2)$$

where B is a range of the template 606.

Figure 5F:
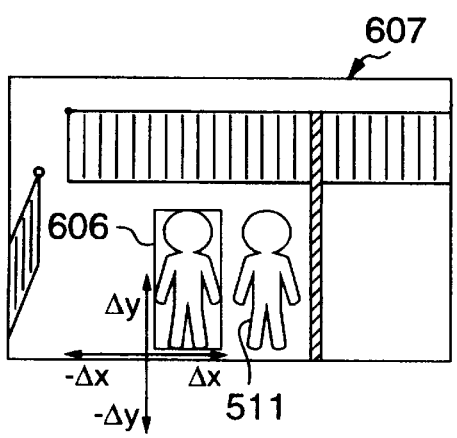
Figure 5G:
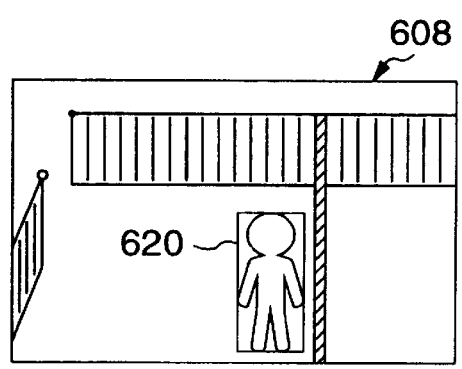

As shown in FIG. 5F, the degree of matching is calculated in accordance with the formula (2) each time the template 606 is moved by a predetermined number of pixels ($\Delta x$, $\Delta y$) (for example, one pixel) in x and/or y directions (horizontal and/or vertical directions) from the position shown in FIG. 5F on the input image. The template 606 is moved in a predetermined pixel range, for example, 64-pixel range (that is, $-64 \leq \Delta x < 64$, $-64 \leq \Delta y < 64$) and the position 620 of the template at which the degree of matching, that is, $r(\Delta x, \Delta y)$ is maximum (that is, the distance of movement ($\Delta x'$, $\Delta y'$) of the template) is detected. When the degree of matching obtained in this manner is low, the range of movement of the template is expanded to not smaller the 65 pixels and the position at which the degree of matching is high is again detected. The range of movement of the template is set to not smaller than the range in which the object moves for each input image.

When the same image as that of the template 606 is included in the input image 607, this correlation value is 1.0 and it decreases as the degree of matching decreases.

Such a matching method is described in "Introduction of Computer Image Processing" supervised by Tamura, published by Soken Publishing Co., March 1985, pp.148–153.

Then, in a distance of movement calculation step 17, a distance of movement d of the object to be monitored, that is, the distance of movement ($\Delta x'$, $\Delta y$) of the template (FIG. 5E) is derived. Then, in a step 18, whether the object to be monitored is outside of a monitor area 500 or not is determined. Namely, the distance of movement d obtained in the step 17 is added to the coordinate x, y of the template 606 and whether the coordinate of the template after the movement, obtained by the addition is outside of the monitor area or not is determined. The coordinate of the monitor area 500 is previously stored in a memory such as the image memory 1103. If it is determined that the coordinate is outside of the monitor area, the process returns to the image input step 11 and the processes of the steps 11 et seq are conducted for a new input image. In the step 18, whether the maximum degree of matching obtained in the step 16 is not larger than a predetermined threshold or not is further determined, and if it is not larger than the predetermined threshold, it is determined that the object to be monitored is not present in the input image 607 and the process returns to the image input step 11.

When the object to be monitored is within the coordinates of the monitor area and the maximum degree of matching obtained in the step 16 exceeds the predetermined threshold, the process proceeds to a step 19. In the step 19, whether the distance of movement d of the object to be monitored is not smaller than a predetermined value or not is determined, and when it is smaller than the predetermined value, the process returns to the step 15 to conduct the processes of the step 15 et seq for another new input image. When the distance of movement d of the object to be monitored is not smaller than the predetermined value, the image portion in the image 608 having the pattern matched with the template 606 is updated as a new template in a step 20.

The processes of the steps 15~20 may be conducted, for example, for each frame of the input image.

In accordance with the background technique, the object to be monitored can be detected even when the view field changes by the change of the direction of image pick-up of the TV camera or the size of the object to be monitored changes by the change of the distance between the object to be monitored and the TV camera or the change of the zoom ratio of the TV camera. Further, since the shape of the detected object is compared with the latest updated template at certain time interval, the tracing of the same object to be monitored is attained. Further, even when a plurality of objects are present in the view field, the object to be traced may be specified for tracing.

In the background technique, however, the object to be monitored may not be stably detected when the apparent size of the object to be monitored, picked up by the TV camera (that is, the size of the image of the picked-up object) changes.

Figure 6A:
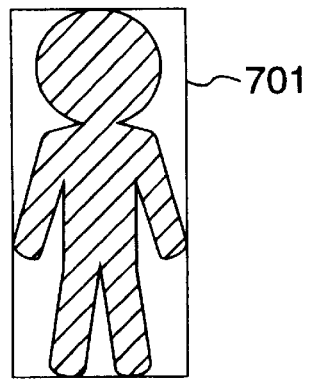
Figure 6B:
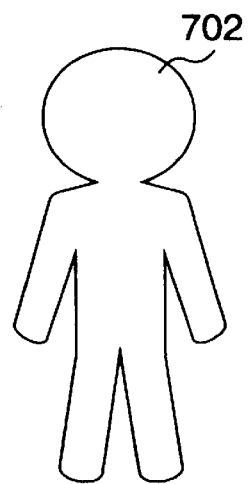
Figure 6C:
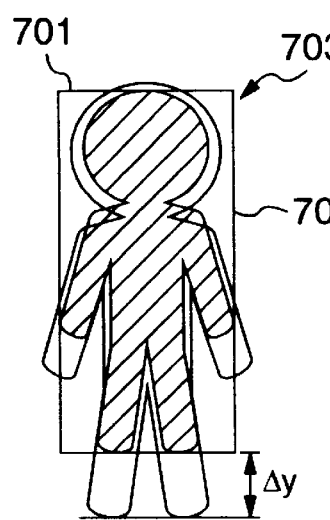
Figure 6D:
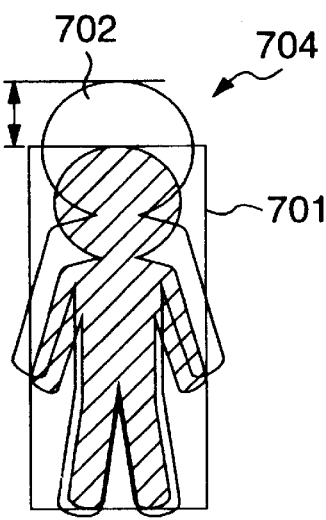

For example, it is assumed that a human patter 701 shown in FIG. 6A is used as the template and the matching with a human pattern 702 (FIG. 6B) having a different size than that of the template 701 is determined. In the matching, an area having a high contrast of intensity value such as a portion having a pattern or a clear outline tends to exhibit a high degree of matching. This is because, if the high contrast area is matched with deviation, the intensity difference between the template and the matched image increases. Accordingly, when the contrast of a head of the human pattern is higher than that of other portion, the template 701 and the pattern 702 are matched such that the heads of the human patterns match as shown in a matching pattern 703 of FIG. 6C. On the other hand, when the contrast of a foot of the human pattern is higher than that of other portion, the template 701 and the pattern 702 are matched such that the feet of the human patterns match as shown in a matching pattern 704 of FIG. 6D. When the input image derived from the TV camera from time to time in the actual image and the template are matched, the contrast of the head may be higher at one time and the contrast of the foot may be higher at other time. In this case, the matching is not made for the particular portion of the human pattern such as the head or the foot but stable matching is conducted such as the head at one time and the foot at other time. When the length in the vertical scan direction or the height of the human pattern 701 is 100 pixels and the height of the human pattern 702 is 120 pixels (apparently larger by 20%), a difference ($\Delta y$) of the matching between those patterns is up to 20 pixels as shown in FIGS. 6C and 6D. This deference increases in proportion to the size of the template. When the size (height) of the template image is 100 pixels and the object to be monitored apparently expands by 20%, a difference of the sizes (heights) between the template and the object picked up in the input image is 20 pixels.

Figure 6E:
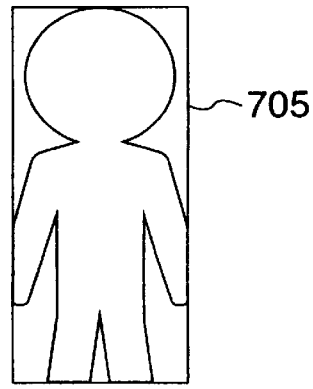

Accordingly, when the pattern matching is conducted at the head as shown in FIG. 6C, a new template lacks the feet and ends of hands as shown in FIG. 6E.

Figure 7A:
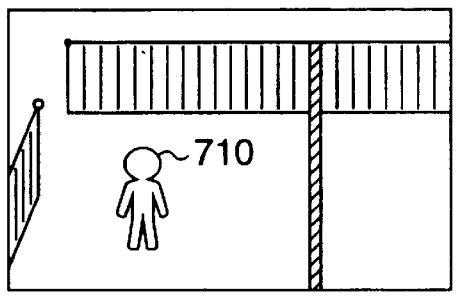
FIGS. 7A~7H illustrate template matching by the background technology of the present invention when an object to be monitored changes.
Figure 7B:
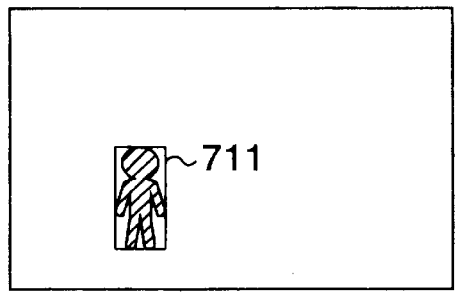
Figure 7C:
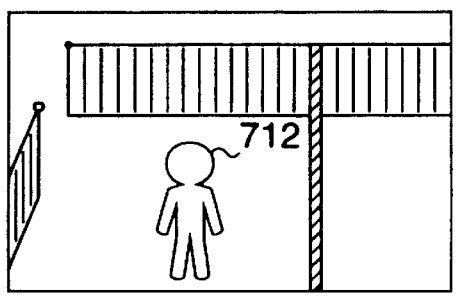
Figure 7D:
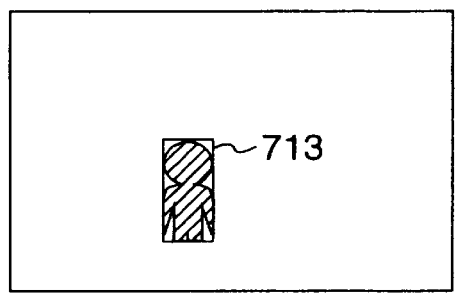
Figure 7E:
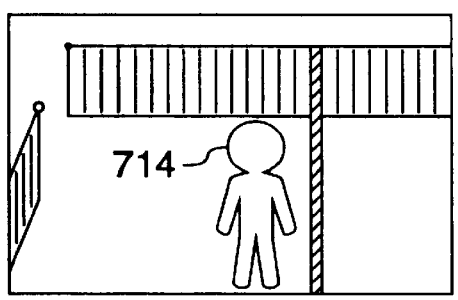
Figure 7F:
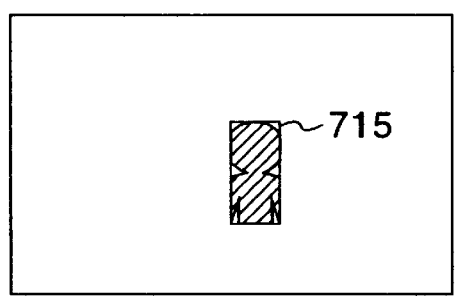

Referring to FIGS. 7A~7F, a process when the apparent size of the human pattern increases is explained. It is first assumed that the template is registered as the template 711 of FIG. 7B when the human pattern 710 picked up by the TV camera is in the state shown in FIG. 7A. Then, when the size of the human pattern increases like the pattern 712 as shown in FIG. 7C, the matching of the pattern 712 and the template 711 is made for the heads and the template is updated as the template of FIG. 7D. In this case, the template 713 lacks the feet. Further, when the size of the human pattern increases to the pattern 714 as shown in FIG. 7E, the matching of the pattern 714 and the template 713 is made for the heads and the template is updated as the template 715 of FIG. 7F. In this case, the template 715 lacks substantial portions of the feet and the hands. Accordingly, under this condition, it is difficult to subsequently make the matching of the template 715 and the human pattern.

Figure 7G:
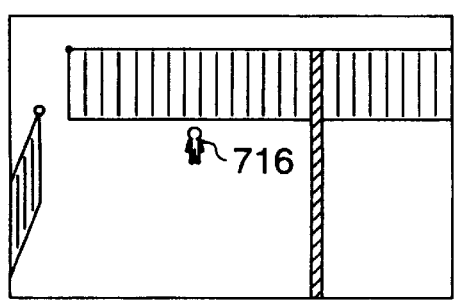
Figure 7H:
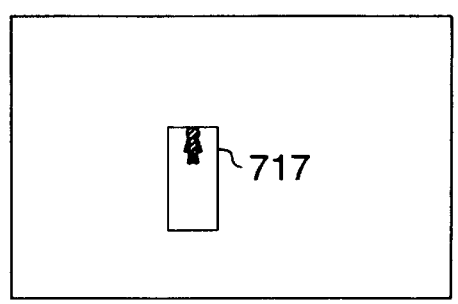
Figure 8:
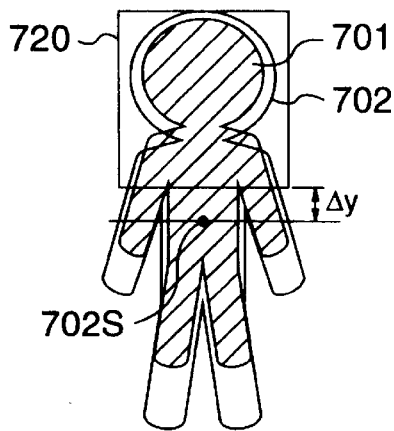
FIG. 8 illustrates a basic principle of the present invention.

On the other hand, when the apparent size of the human pattern decreases like the pattern 716 shown in FIG. 7G, the pattern portion of the template also becomes smaller like the template 717 of FIG. 7H. Accordingly, under this condition, it is difficult to subsequently make the matching of the template 717 and the human pattern.

The present invention allows more stable and positive matching even when the apparent size of the object to be monitored, picked up by the TV camera changes.

First, a principle of the present invention is explained. In FIGS. 6C and 6D, it is assumed that the size (height) of the template is one half of that described above, that is, 50 pixels. In this case, a difference of heights Δy between centers 702S of the template 720 and the human pattern 702 is 10 pixels which is one half of that described above. Thus, in a basic embodiment of the present invention, the template formed by a circumscribed rectangle (for example, rectangle) of the object to be monitored is divided into a plurality of portions, and they are registered, and the matching is independently made with the picked-up object to be monitored for each of the plurality of registered divided templates. Thus, a difference of sizes between the template and the object to be monitored when the apparent size of the object to be monitored changes is reduced. Accordingly, in such a basic embodiment, more stable and positive matching may be made even if the apparent size of the object to be monitored picked up by the TV camera changes.

The basic embodiment is explained with reference to a flow chart of FIG. 9 and FIGS. 10A~10F.

In the basic embodiment, the image of the detected object to be monitored is divided into a plurality of portions, for example, two portions vertically to form first and second templates.

Figure 10A:
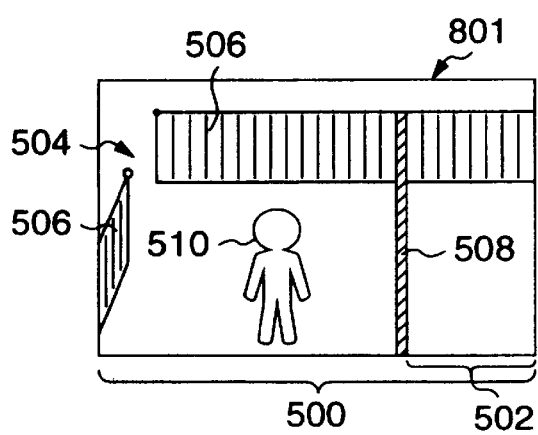
FIGS. 10A~10F illustrates a video image monitoring method by the basic embodiment of the present invention shown in FIG. 9, FIGS. 11A–11D illustrate the updating of a template in the basic embodiment of the present invention shown in FIG. 9.
Figure 10B:
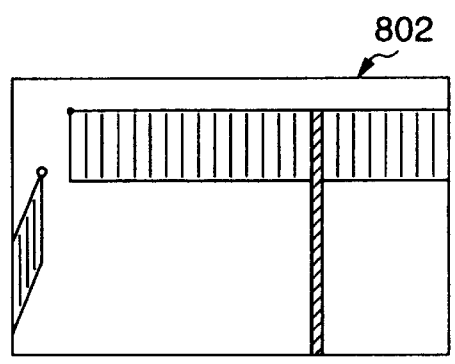
Figure 10C:
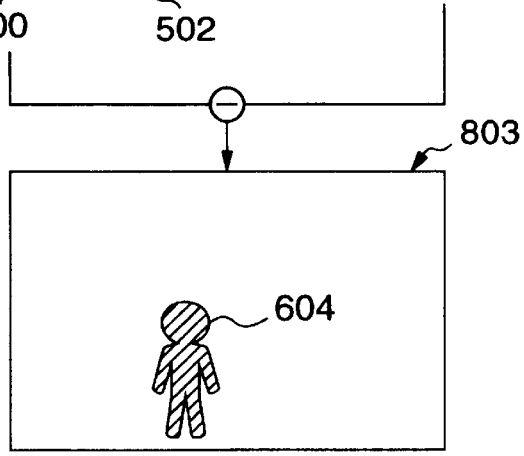
Figure 10D:
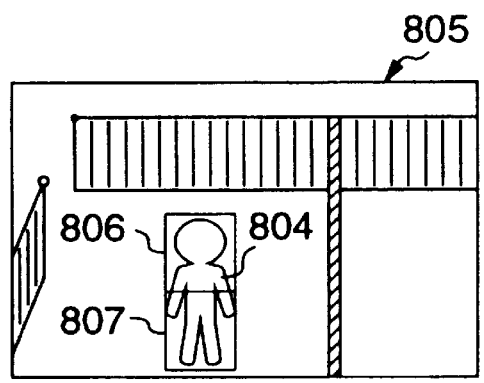
Figure 10E:
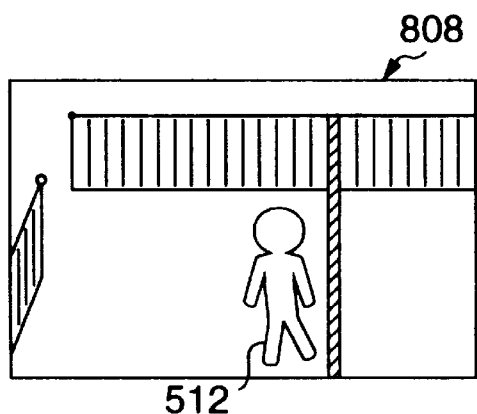
Figure 10F:
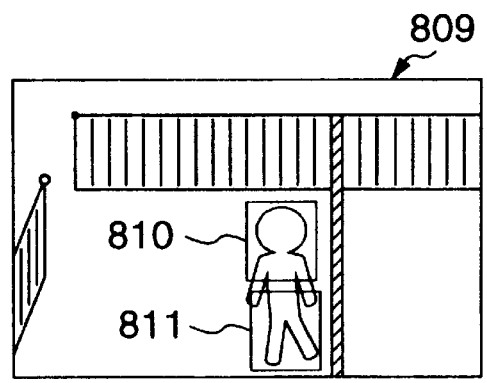

First, the differential image of the image signal 801 (FIG. 10A) and the background image 802 (FIG. 10B) previously registered in the image memory 1103 is calculated by the background image input step 10, the image input step 11, the differential process step 12 and the binarization process step 13 which are identical to the steps 10, 11, 12 and 13 of FIG. 4, and the area 804 (FIG. 10C) in which the object is present is detected by the threshold process. In a template registration step 24, an image of an upper half of the image of the rectangular area which circumscribes to the detected area 804 of the input image 805 (same as the input image 801) in the step 11 is extracted, and this image is registered as a first template 806 ft1(x, y). Similarly, the image of a lower half is extracted and this image is registered as a second template 807 ft2(x, y) (FIG. 10D). Then, in an image input step 25, like in the image input step 11, a next new image sinal 808 (FIG. 10E) corresponding to the 320 240 pixels is inputted to the image memory. In a template matching step 26, the degree of matching (correlation) represented by the formula (2) is determined independently for each of the first and second templates and the image 808 to detect areas 810 and 811 having the highest degrees of matching with the template among the input image 809 (FIG. 10F). An image 809 shows an example in which the apparent size of the object to be monitored increases as compared to the image 805 and the distance between the new position 810 detected by the first template and the new position 811 detected by the second template is larger than the distance between the first template 806 and the second template 807. Then, in a distance of movement calculation step 27, the distance of movement of the object to be traced is calculated from the position detected by the first and second templates of the images 805 and 809.

Figure 11A:
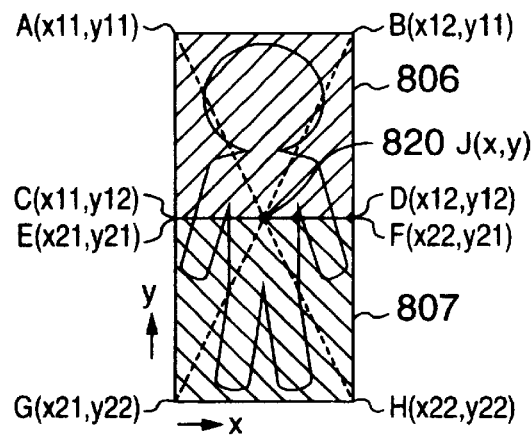
FIG. 11E illustrates change of a size of the template in a second embodiment of the present invention.
Figure 11B:
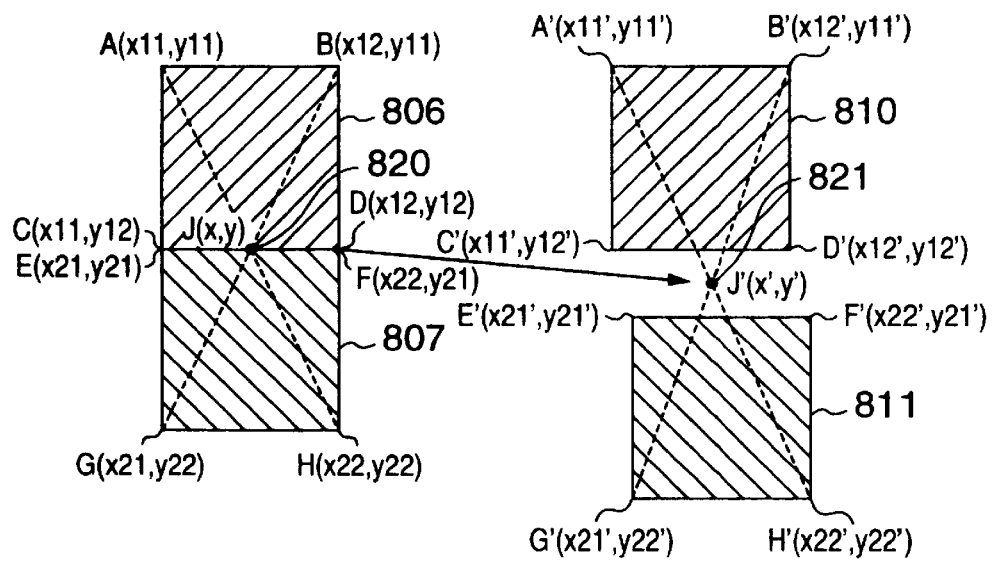

Referring to FIGS. 11A and 11B, a method for calculating the distance of movement of the object to be monitored is explained. FIG. 11A shows first and second templates 806 and 807 before matching corresponding to FIG. 10D (corresponding to the templates 806 and 807 of FIG. 10D). Coordinates A, B C and D of four apexes of the first template 806 are represented by $(x_{11}, Y_{11})$, $(x_{12}, Y_{11})$, $(x_{11}, y_{12})$ and $(x_{12}, y_{12})$, respectively, and coordinates E, F, G and H of four apexes of the second template 807 are represented by $(x_{21}, y_{21})$, $(X_{22}, y_{21})$, $(X_{21}, y_{22})$ and $(x_{22}, y_{22})$, respectively. Thus, the coordinate of the entire area of the first template 806 before the object to be monitored is moves is represented by $(x_{11}, y_{11})$–$(x_{12}, y_{12})$ by using the coordinates of the apexes A and D on the diagonal line. Similarly, the coordinate of the entire area of the second template 807 before the object to be monitored moves is represented by $(x_{21}, y_{21})$–$(x_{22}, y_{22})$ by using the coordinates of the apexes E and H on the diagonal line. As shown in FIG. 11B, in the first and second templates 806 and 807 before matching, a coordinate J(x, y) of a crosspoint 820 of a line segment connecting the coordinate A and the coordinate H and a line segment connecting the coordinate B and the coordinate G is defined as a representative position before matching.

Figure 11C:
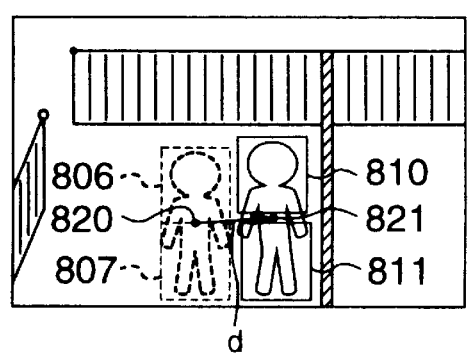

Similarly, as shown in FIG. 11B, in the first and second templates 810 and 811 after matching (corresponding to the templates 810 and 811 of FIG. 10F), coordinates A', B', C' and D' of four apexes of the first templates 810 are represented by $(x_{11}', y_{11}')$, $(x_{12}', y_{11}')$, $(x_{11}', y_{12}')$ and $(x_{12}', y_{12}')$, respectively, and coordinates E', F', G' and H' of four apexes of the second template are represented by $(x_{21}', y_{21}')$, $(x_{21}', y_{21}')$, $(x_{22}', y_{21}')$ and $(x_{22}', y_{22}')$, respectively. Thus, a coordinate J' (x', y') of a crosspoint 821 of a line segment connecting the coordinates A' and H' and a line segment connecting the coordinates B' and G' is defined as a representative position after matching. As shown in FIG. 11C, assuming that a change from the representative position before matching to the representative position after matching is defined as a distance of movement of the object to be monitored d=(dx, dy), x nd y components of the distance of movement d are determined by the following formula (3):

$$dx = x' - x = \qquad (3)$$

$$\frac{x'_{22}(x'_{12} - x'_{11}) + x'_{11}(x'_{22} - x'_{21})}{(x'_{12} - x'_{11}) + (x'_{22} - x'_{21})} - \frac{x_{22}(x_{12} - x_{11}) + x_{11}(x_{22} - x_{21})}{(x_{12} - x_{11}) + (x_{22} - x_{21})}$$

$$dy = y' - y = \frac{y'_{22}(x'_{12} - y'_{11}) + x'_{11}(x'_{22} - x'_{21})}{(x'_{12} - x'_{11}) + (x'_{22} - x'_{21})} -$$

$$\frac{y_{22}(x_{12} - x_{11}) + y_{11}(x_{22} - x_{21})}{(x_{12} - x_{11}) + (x_{22} - x_{21})}$$

Then, in a step 28, whether the object to be monitored is outside of the monitor area 500 or not is determined. Namely, the distance of movement d obtained in the step 27 is added to the coordinates $(x_{11}, y_{11})$–$(x_{12}, y_{12})$ and $(x_{21}, y_{21})$–$(x_{22}, y_{22})$ of the templates before matching, and whether the resulting two coordinates are outside of the monitor area or not is determined. The coordinate of the monitor area 500 is previously stored in the image memory 1103. When one of the coordinates $(x'_{11}, y'_{11})$–$(x'_{12}, y'_{12})$ and $(x'_{21}, y'_{21})$–$(x'_{22}, y'_{22})$ of the two templates derived by the addition is outside of the monitor area, the process returns to the image input step 11 and conducts the process of the steps 11 et seq for a new input image. In the step 28, whether the maximum degree of matching of one of the two templates derived in the step 26 is not larger than a predetermined threshold or not is determined. When the maximum degree of matching of one of the two templates derived in the step 26 is not larger than the predetermined threshold, it is determined that the object to be monitored is not present in the input image 805 and the process returns to the image input step 11.

When the coordinates of the two templates after movement are within the coordinate of the object to be monitored and the maximum degrees of matching of the two templates derived in the step 26 exceed the predetermined threshold, the process proceeds to a step 29. In the step 29, whether the distance of movement d of the object to be monitored derived in the step 27 is not smaller than a predetermined value or not is determined, and when it is smaller than the predetermined value, the process returns to the step 25 to conduct the process of the step 25 et seq for another new input image. When the distance of movement d of the object to be monitored is not smaller than the predetermined value, an image portion 810 in the image 808 which patter-matches with the template 806 is updated as a new first template and an image portion 811 in the image 808 which pattern-matches with the template 806 is updated as a new second template in a step 30.

The process of the steps 25~30 may be conducted for each frame of the input image.

After the completion of the step 30, the process returns to the step 25 to input a next new image, and in the step 26, the new input image and the latest first and second templates stored in the image memory 1103 are matched. In this manner, the steps 25~30 are sequentially executed for the subsequent new input images and the templates are sequentially updated as the object to be monitored moves to trace it.

Figure 9:
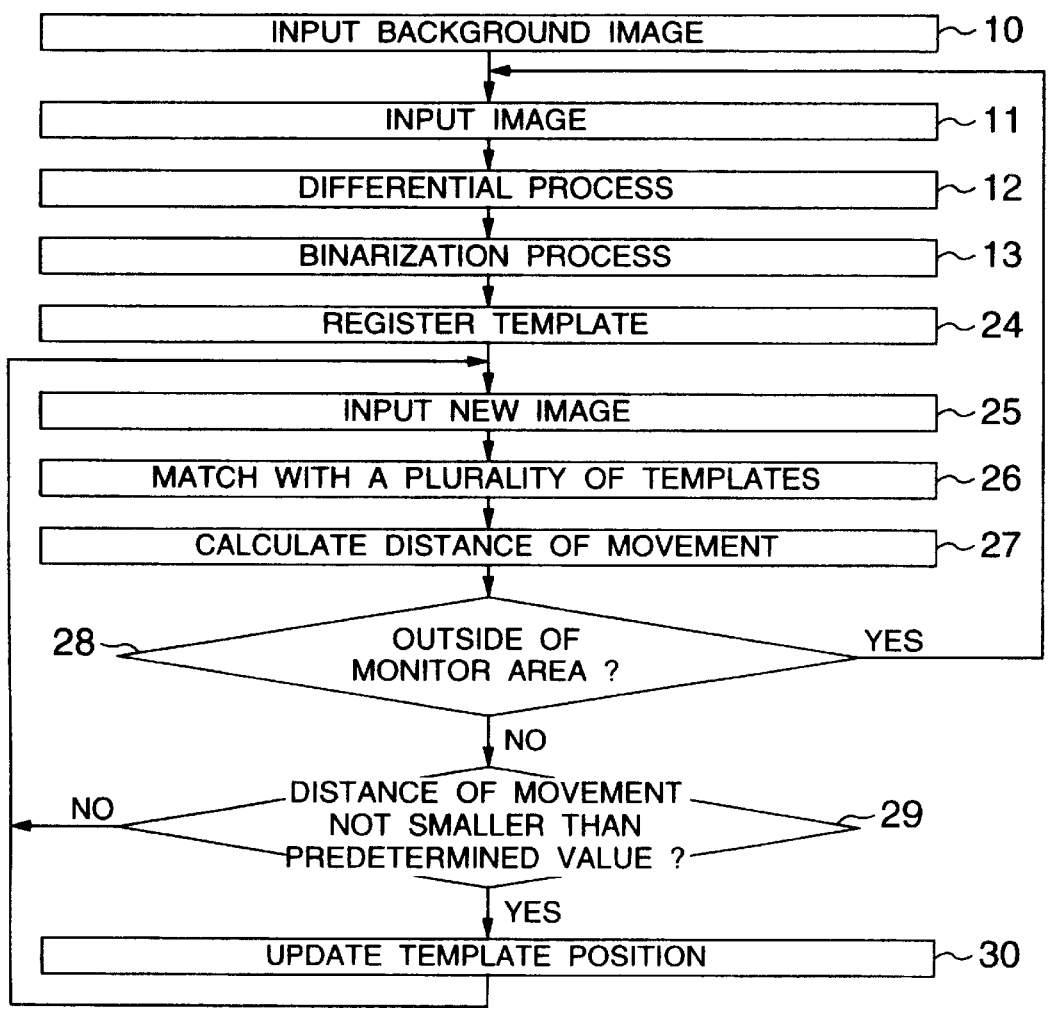
FIG. 9 shows a flow chart for illustrating a video image monitoring method by a basic embodiment of the present invention.

By dividing the template into a plurality of portions in the process procedure of FIG. 9 and conducting the matching by independently using the respective templates, the deviation of the matching position which occurs when the apparent size of the object changes is reduced and more stable detection is attained.

Figure 11D:
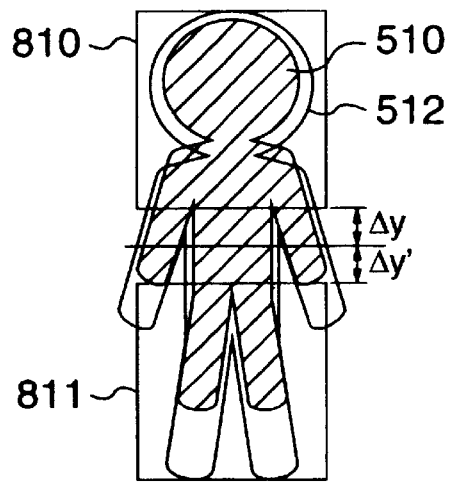

For example, as shown in FIG. 11D, even when the size of the image of the object to be monitored increase from the image 510 to the image 512 by 20 pixels in the y direction, the position deviation of the template to the pixel 512 may be eliminated by dividing the template into two portions, that is, the first and second templates 810 and 811 and the object to be monitored can be detected in a stable manner.

In the present embodiment and the respective embodiments to be described later, in the step 28, when one of the coordinates of the two templates after movement derived by adding the distance of movement d is outside of the monitor area, it is determined that the object to be monitored is outside of the monitor area. Alternatively, when all coordinates of the two templates after movement are outside of the monitor area, it may be determined that the object to be monitored is outside of the monitor area. Further, when the coordinate (x', y') of the representative position J' after matching is outside of the monitor area, it may be determined that the object to be monitored is outside of the monitor area.

In the present embodiment and the respective embodiments to be described later, in the step 29, the template position is updated only when the distance of movement of the template is not smaller than the predetermined value. Alternatively, it may be updated independently from the distance of movement of the template.

A second embodiment in which an apparent magnification factor of the object to be monitored is determined from a change of the distances between templates before and after matching and the size of the template after matching is updated in accordance with the magnification factor is now explained.

Here, the apparent magnification factor r of the object to be monitored is determined from the change of the distances between templates after and before matching. The magnification factor r is determined by the following formula (4). The approximation of the formula (4) may be applied when the template is vertically divided:

$$r = \sqrt{\frac{(x'_{22} - x'_{11})^2 + (y'_{22} - y'_{11})^2}{(x_{22} - x_{11})^2 + (y_{22} - y_{11})^2}} \approx \frac{y'_{22} - y'_{11}}{y_{22} - y_{11}} \qquad (4)$$

The coordinates in the formula (4) indicate the coordinates in FIG. 11B. Namely, the magnification factor r is determined in FIG. 11B as a ratio of a difference $(y_{22}-Y_{11})$ between the y coordinates of the coordinate A $(x_{11}, y_{11})$ of the first template and the coordinate H $(x_{22}, y_{22})$ of the second template before matching and a difference $(y_{22}'-y_{11}')$ between the y coordinates of the coordinate A' $(x_{11}', y_{11}')$ of the first template and the coordinate H' $(x_{22}', y_{22}')$ of the second template after matching.

Alternatively, when the template is vertically divided, the magnification factor r may be determined by a ratio of a difference $(y_{22}-y_{11})$ between the y coordinates of the coordinate B $(x_{12}, y_{11})$ of the first template and the coordinate G $(x_{21}, y22)$ of the second template before matching and a difference $(y_{22}'-y_{11}')$ between the y coordinates of the coordinate B' $(x_{12}', y_{11}')$ of the first template and the coordinate G' $(x_{21}', y_{22}')$ of the second template after matching.

Figure 12:
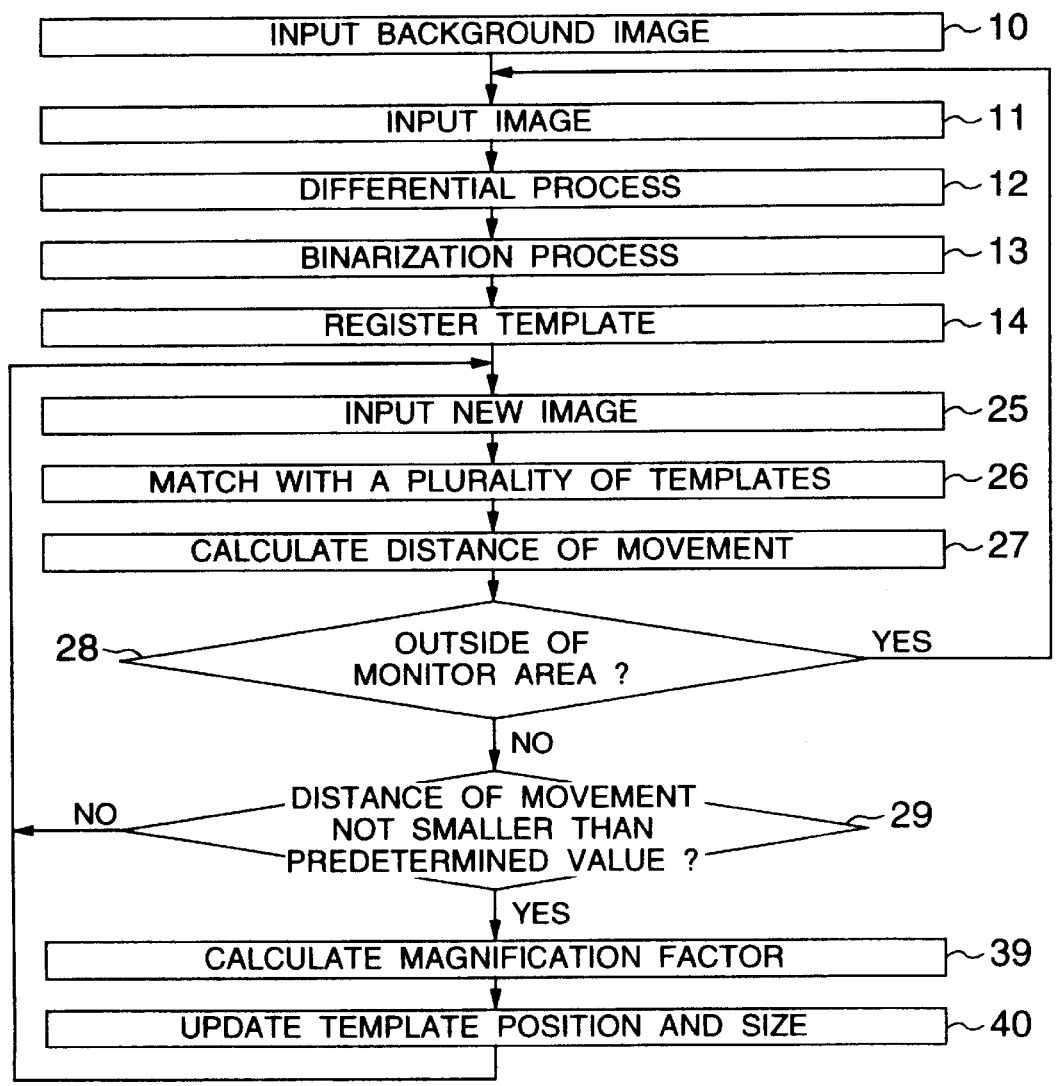
FIG. 12 shows a flow chart for illustrating a video image monitoring method by the second embodiment of the present invention.

FIG. 12 shows a process procedure of the second embodiment. The process of the steps 10~29 is same as that of the first embodiment shown in FIG. 9. In a magnification factor calculation step 39, the magnification factor r is calculated based on the formula (4) as described above. Then, in a template update step 40, the positions of the first and second templates 810 and 811 (FIG. 11B) after matching are determined in the same manner as that of the step 30 in FIG. 9. Further, the sizes of the first and second templates 810 and 811 after matching are updated in accordance with the magnification factor r determined in the step 30.

Figure 11E:
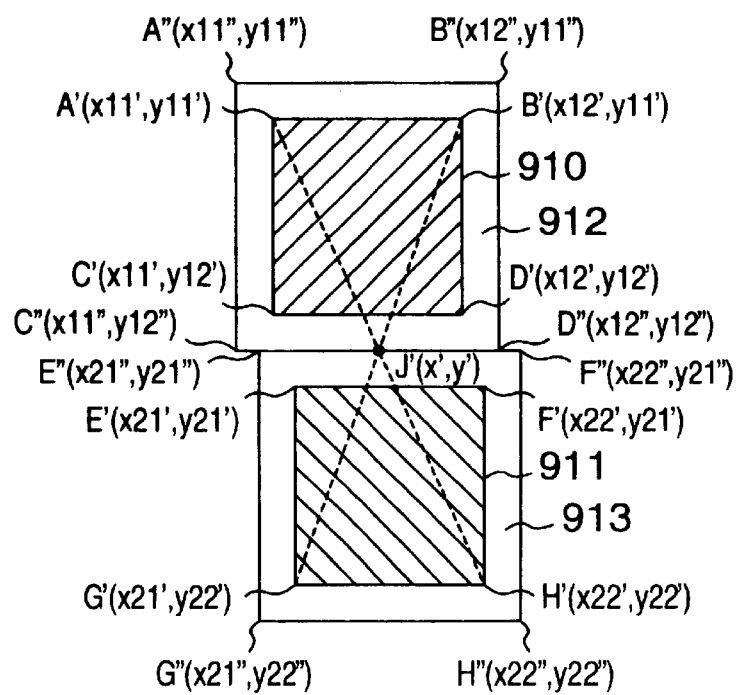

FIG. 11E shows the first and second templates 812 and 813 having sizes thereof update. In the present embodiment, as an example of updating, the coordinate A" ($x_{11}''$, $y_{11}''$) and the coordinate D" ($x_{12}''$, $y_{12}''$) of the first template 812 after the updating are defined as follow:

$$A'' = (x_{11}'', y_{11}'') = \left(x_{11}' - \frac{x_{12}' - x_{11}'}{2}r, y_{11}' - \frac{y_{12}' - y_{11}'}{2}r\right)$$

$$D'' = (x_{12}'', y_{12}'') = \left(x_{12}' + \frac{x_{12}' - x_{11}'}{2}r, y_{12}' + \frac{y_{12}' - y_{11}'}{2}r\right)$$

Accordingly, the entire area of the first template 810 after the updating is represented by the following formula (5) by using the coordinates A" and D":

$$\left(x_{11}' - \frac{x_{12}' - x_{11}'}{2}r, y_{11}' - \frac{y_{12}' - y_{11}'}{2}r\right) - \\ \left(x_{12}' + \frac{x_{12}' - x_{11}'}{2}r, y_{12}' + \frac{y_{12}' - y_{11}'}{2}r\right) \quad (5)$$

Similarly, the coordinates E" ($x_{21}''$, $y_{21}''$) and the coordinate H" ($x_{22}''$, $y_{22}''$) of the second template after the updating are defined as follows:

$$E'' = (x_{21}'', y_{21}'') = \left(x_{21}' - \frac{x_{22}' - x_{21}'}{2}r, y_{21}' - \frac{y_{22}' - y_{21}'}{2}r\right)$$

$$H'' = (x_{22}'', y_{22}'') = \left(x_{22}' + \frac{x_{22}' - x_{21}'}{2}r, y_{22}' + \frac{y_{22}' - y_{21}'}{2}r\right)$$

Accordingly, the entire area of the second template 811 after the updating is represented by the following formula (6) by using the coordinates E" and H":

$$\left(x_{21}' - \frac{x_{22}' - x_{21}'}{2}r, y_{21}' - \frac{y_{22}' - y_{21}'}{2}r\right) - \\ \left(x_{22}' + \frac{x_{22}' - x_{21}'}{2}r, y_{22}' + \frac{y_{22}' - y_{21}'}{2}r\right) \quad (6)$$

When the magnification factor obtained in the step 39 is not smaller than a first predetermined value which exceeds 1.0, or not larger than a second predetermined value which is smaller the 1.0, the sizes of the first and second templates may not be updated.

Figure 13A:
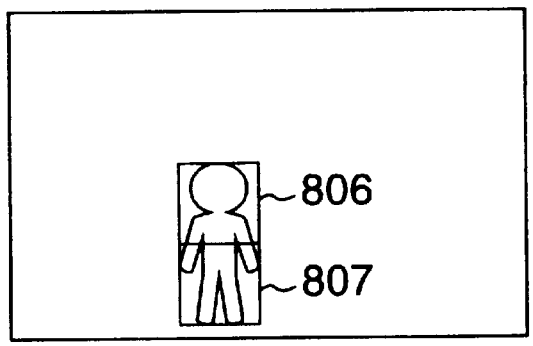
FIGS. 13A–13C illustrate the updating of the size of the template in the second embodiment.
Figure 13B:
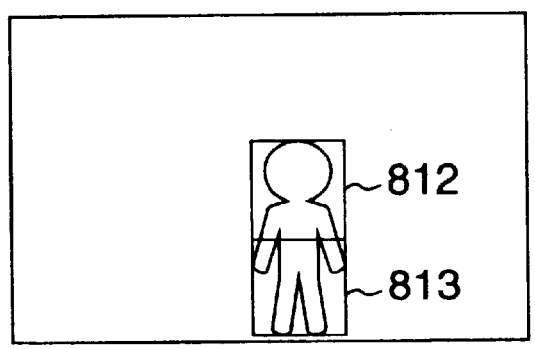
Figure 13C:
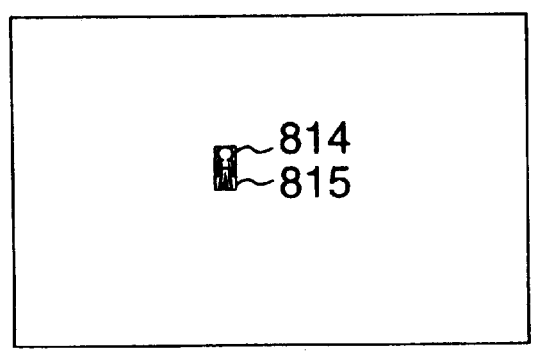

In accordance with the present embodiment, when the object to be monitored is in a state shown in FIG. 13A, the first and second templates 806 and 808 have the sizes as shown, and when the size of the object to be monitored increases as shown in FIG. 13C, the sizes of the templates are changed or reduced as shown by the first and second templates 814 and 815 in accordance with the change of the size of the object.

In this manner, by updating the sizes of the templates in accordance with the apparent size of the object to be monitored, more stable and positive detection and tracing of the object to be monitored are attained.

A third embodiment in which a distance between the object to be monitored and the TV camera is further detected in the second embodiment is now explained.

Figure 14:
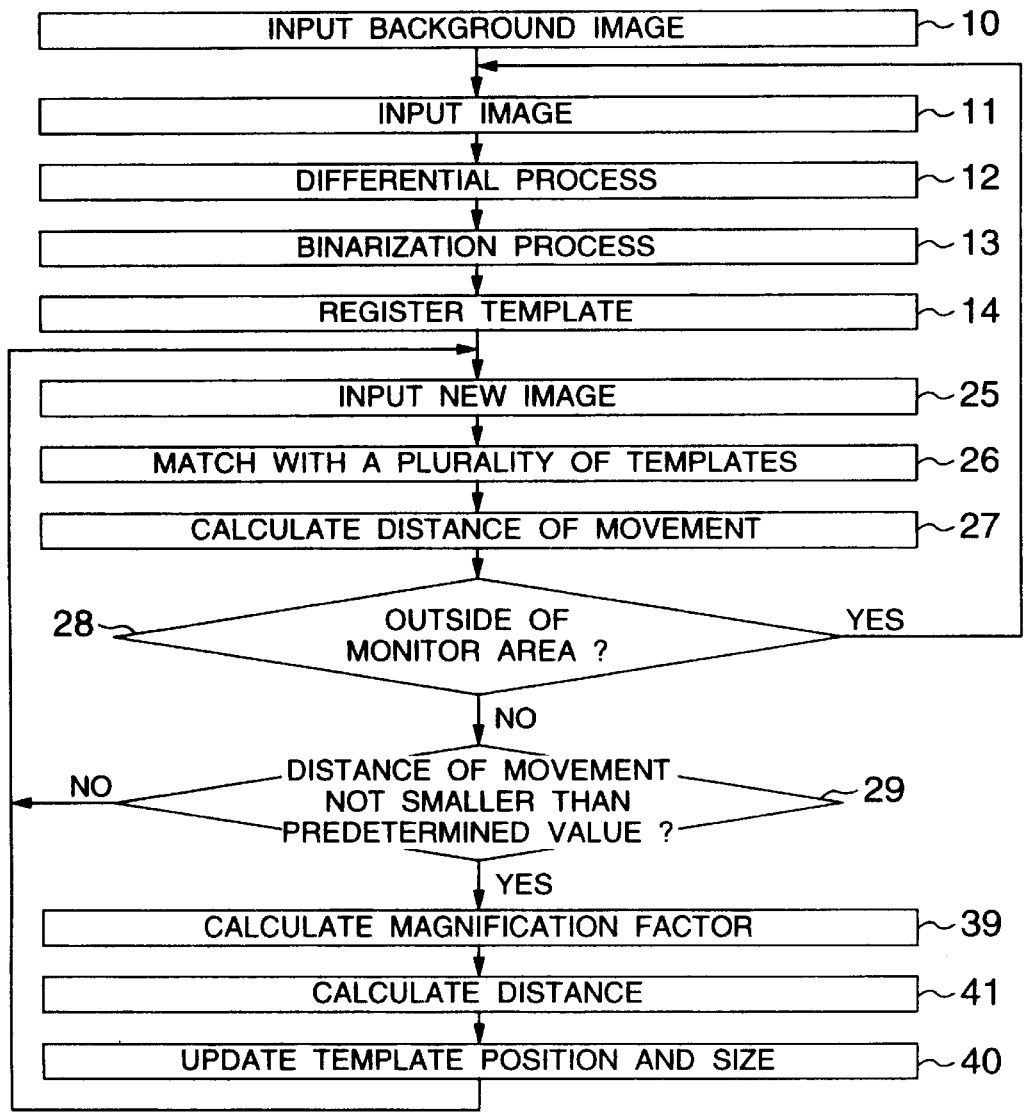
FIG. 14 shows a flow chart for illustrating a video image monitoring method by a third embodiment.

FIG. 14 shows a flow chart for illustrating a video image monitoring method in the third embodiment. A distance calculation step 41 for calculating the distance between the object to be monitored and the TV camera is added after the magnification factor calculation step 39 in the flow chart of FIG. 12.

Figure 15A:
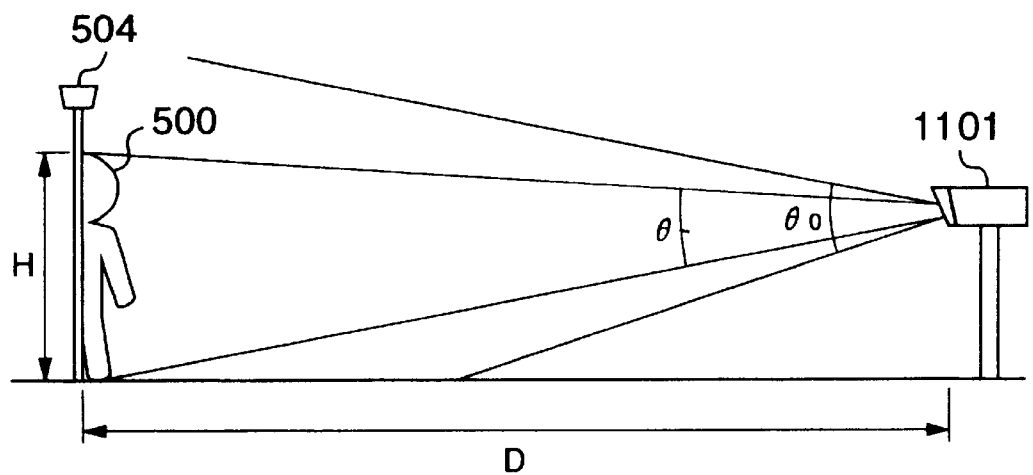
FIGS. 15A–15B illustrate a calculation method of a distance between the object to be monitored and a TV camera in the third embodiment.
Figure 15B:
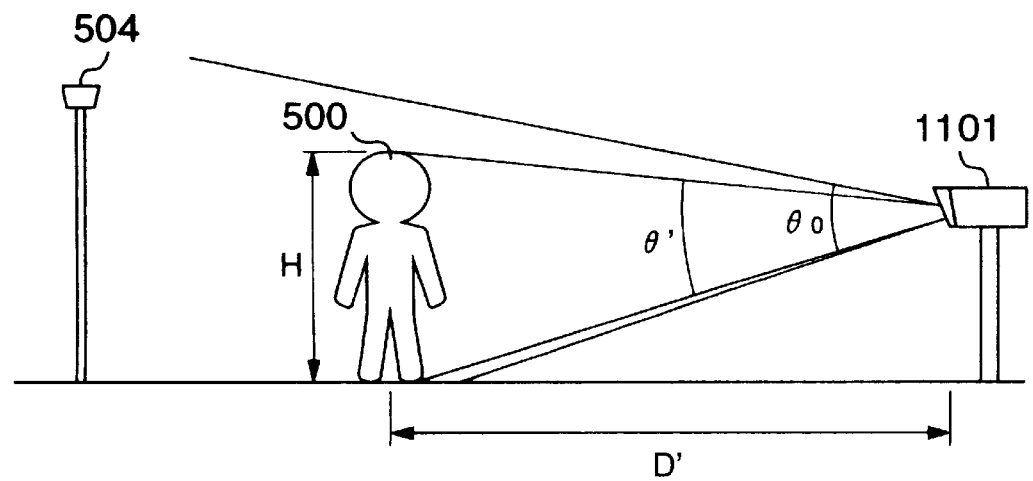

FIGS. 15A and 15B illustrate a calculation method of the distance between the object to be monitored and the TV camera in the third embodiment. The present embodiment may be applied when the object to be monitored intrudes from a gate or a door into the monitor area.

Referring to FIGS. 14, 15A and 15B, the distance calculation method in the present embodiment is explained.

It is assumed that a distance from the TV camera 1101 and the gate 504 is D (m) and a view angle of the TV camera 1101 is θ0. As shown in FIG. 15A, when the object to be monitored 500 passes through the gate 504 and is picked up by the TV camera 1101, the object to be monitored 500 is detected by the image input step 11, the differential process step 12 and the binarization step 13 as it is in the previous embodiments. In the template registration step 14, as shown in FIG. 11A, the first and second templates 806 and 807 are registered. In the steps 25 and 26, the first and second templates 810 and 811 after matching, which matches to the new image when the distance between the object to be monitored 500 and the TV camera changes as shown in FIG. 15B, are produced as shown in FIG. 11B. Then, the process of the steps 27~39 is conducted.

In the next distance calculation step 41, the distance between the object to be monitored and the TV camera in the new image inputted in the step 25 is calculated in the following manner. First, the distance on the image between the two templates 806 and 807 of the picked-up image in FIG. 15A which was registered in the template registration step 14, for example, width in the y direction or the width h=$y_{22}'-y_{11}'$ in the y direction between the coordinates A and H in FIG. 11B is determined. Then, the height H of the actual object to be monitored in FIG. 15A is determined by the following formula (7):

$$\left[H \approx D\tan\theta \approx D\tan\theta\frac{h}{240}\theta_0\right] \quad (7)$$

where the input image size is 320×240 pixels and θ is an image angle of the object.

Then, as shown in FIG. 15B, the width in the y direction between the two templates 810 and 811 in the new image when the distance between the object to be monitored and the TV camera changes as shown in FIG. 15B, that is, the width h'=y22'−y11' between the coordinates A' and H' in FIG. 11B is determined. Then, the distance D' between the actual object to be monitored and the TV camera in FIG. 15B is determined by the following formula (8):

$$D \approx \frac{H}{\tan\theta'} \approx \frac{H}{\tan h' \cdot \theta_0/240} \quad (8)$$

where θ' is an image angle of the object in FIG. 15B.

In this manner, the distance between the object to be monitored which is the intruding object and the TV camera may be determined. Then, the step 40 is conducted.

A fourth embodiment in which a zoom ratio of the zoom lens of the TV camera is further adjusted based on the calculated distance between the object to be monitored and the TV camera in the third embodiment is now explained.

Figure 16:
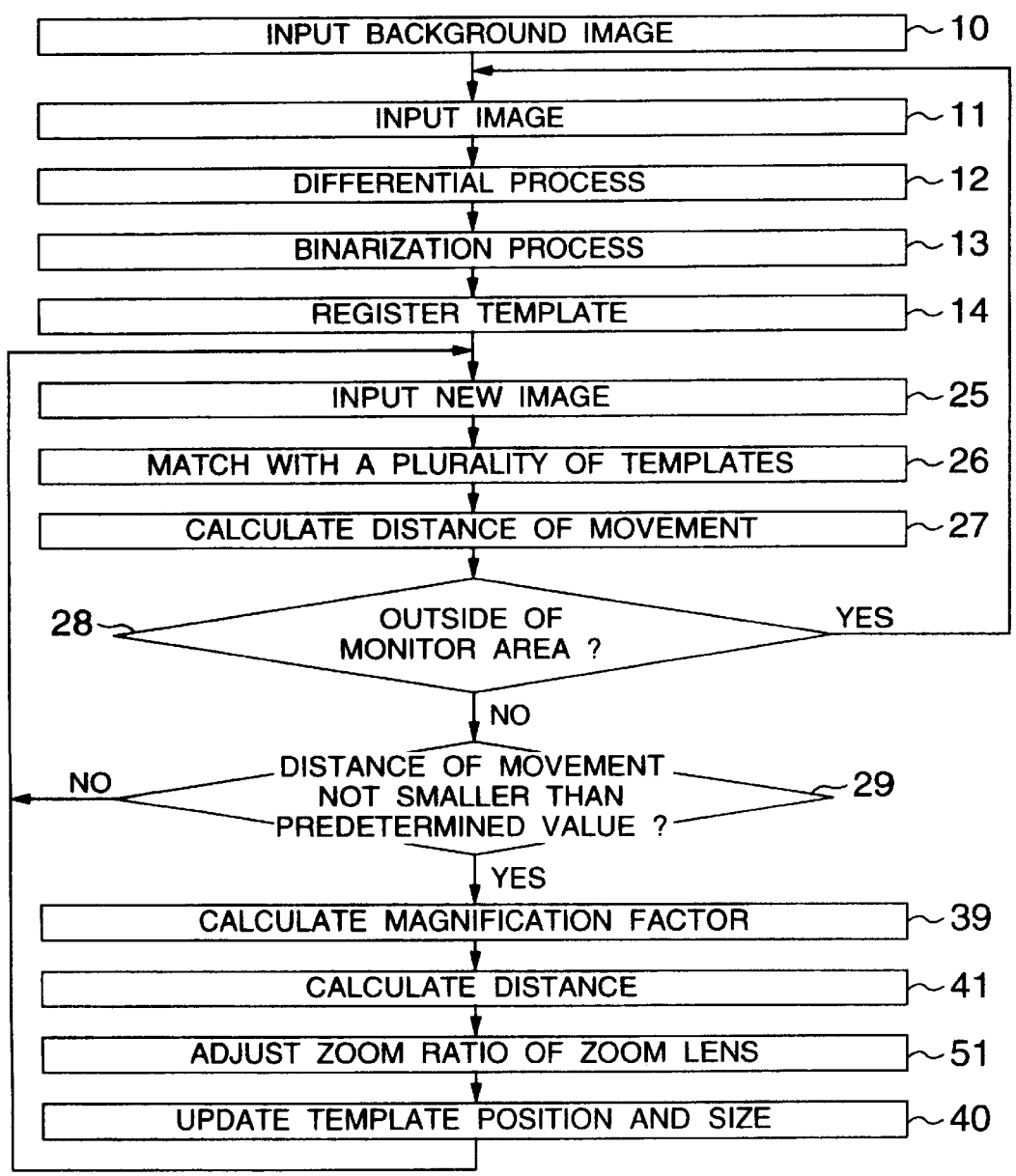
FIG. 16 shows a flow chart illustrating a video image monitoring method by a fourth embodiment of the present invention.

FIG. 16 shows a flow chart for illustrating a video image monitoring method in accordance with the fourth embodiment. A zoom ratio adjustment step 51 for adjusting the zoom ratio of the zoom lens of the TV camera in accordance with the calculated distance between the object to be monitored and the TV camera is added after the distance calculation step 41 between the object to be monitored and the TV camera in the flow chart of FIG. 14.

Namely, the width $h'=y_{22}'-y_{11}'$ in the y direction between the two new templates 810 and 811 obtained in the distance calculation step 41 indicates the apparent size of the object to be monitored when the distance between the object to be monitored and the TV camera changes. Accordingly, in the zoom ratio adjustment step 51, the zoom ratio is controlled in accordance with h' obtained in the step 41. As an example, when h' is not smaller than a predetermined value $h'_1$, the zoom ratio z is reduced to a first predetermined zoom ratio $z_1$, and when h' is not larger than a second predetermined value $h'_2$ ($h'_1 > h'_2$), the zoom ratio is increased to a second zoom ratio z2 (z1<z2).

In another example, the zoom ratio is continuously controlled in accordance with h' obtained in the step 41. In this case, various values of h' and the corresponding zoom ratios may be previously stored in the work memory 1105 as map, and the zoom ratio corresponding to the derived h' may be read from the map.

In a step 51, the CPU 1104 applies a control signal to the camera control I/F 1107 based on the derived zoom ration and controls the zoom ratio of the camera to the derived zoom ratio. Thus, the apparent size of the object to be monitored picked up in the view field of the TV camera (image pick-up screen) may be kept substantially constant without regard to the change of the distance between the object to be monitored and the TV camera.

A fifth embodiment in which a step to determine whether the object to be monitored is present or not, a step to determine whether the object to be monitored intruded into a predetermined area, for example, an off-limit area or not, a step to conduct an alarm process when the object to be monitored intruded into the predetermined area and a step to control the position of the TV camera in accordance with the movement of the object to be monitored are added in the second embodiment shown in FIG. 12, is now explained.

In the present embodiment, the present invention is applied to a video image monitoring system which detects the object to be monitored such as an automobile or a human intruded into the predetermined area and conducts the position control of the TV camera in accordance with the movement of the object to be monitored.

In the present embodiment, an alarm lamp 1110 and an output I/F 1108 as shown in FIG. 3 are provided in addition to the configuration of the above embodiment.

Figure 17:
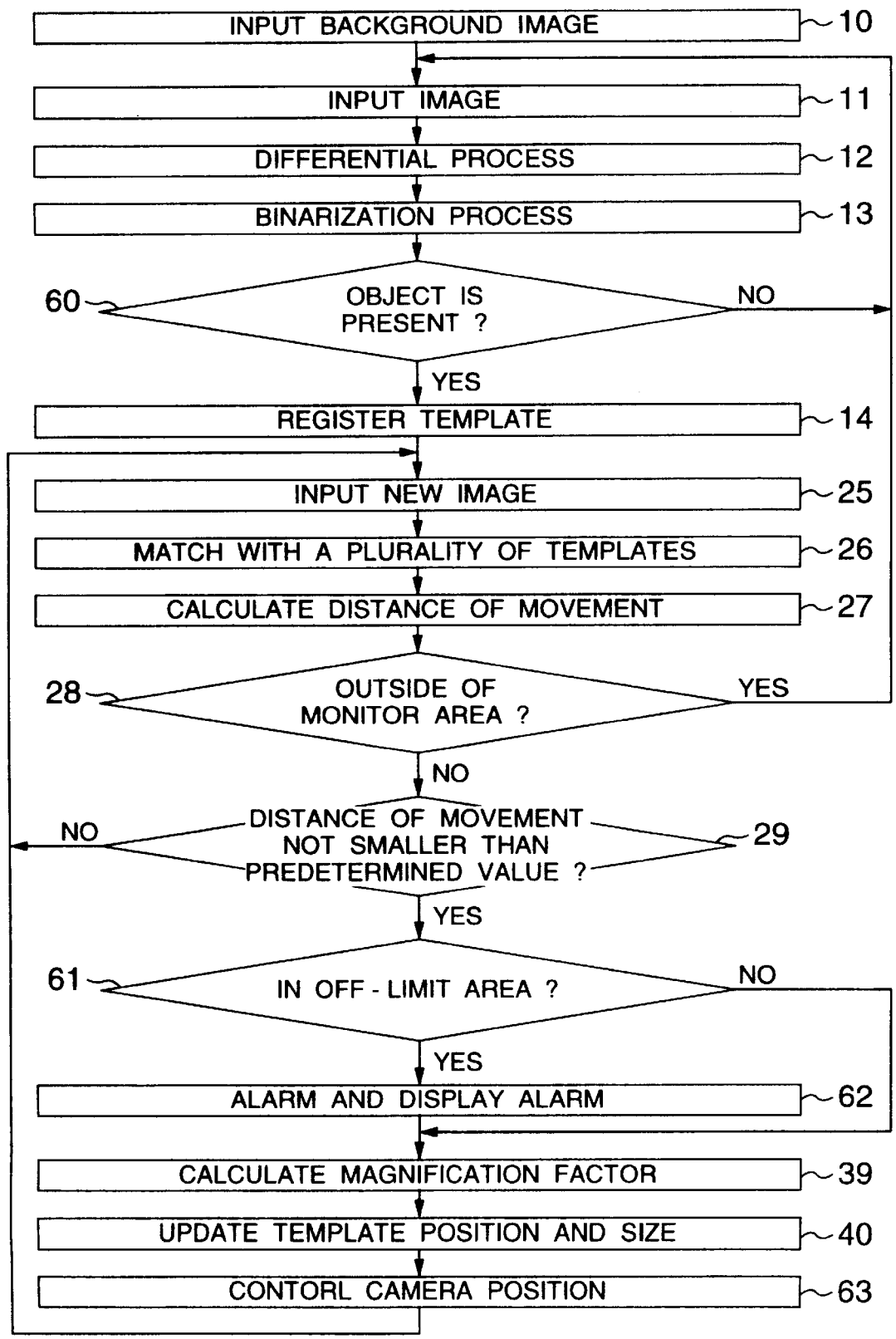
FIG. 17 shows a flow chart illustrating a video image monitoring method by a fifth embodiment of the present invention.

The present embodiment is explained with reference to a flow chart which illustrates a video image monitoring method in accordance with the fifth embodiment shown in FIG. 17.

First, in the background image input step 10, the background image having 320×240 pixels from the TV camera is inputted and read into the image memory 1103, and in the image input step 11, the image data f(x, y) having 320×240 pixels from the TV camera is inputted and read into the image memory. In the differential process step 12, differences of pixels are determined between the background image stored in the image memory and the input image read into in the step 11, and in the binarization process step 13, the resulting differences are binarized (threshold process) to detect an area in which the object to be monitored is present. Then, in a step 60, whether a differential value which exceeds a threshold is present or not is determined for the differences derived in the step 13. When there is not present such a differential value at all, it is determined that the object to be monitored is not present in the input image and the process returns to the image input step 11 to conduct the steps 11~13 and 60 for the next input image.

On the other hand, when the differential value which exceeds the threshold is present, it is determined that he object to be monitored is present in the input image and the process proceeds to the template registration step 14. In the step 14, an upper half of the image detected in the step 13 is registered in the image memory as the first template f1(x, y) and a lower half is registered as the second template f2(x, y).

Then, in the step 25, next new image fs(x, y) from the TV camera is inputted, and in the step 26, the first and second templates registered in the step 14 and the image f(x, y) are matched to determine the degree of matching represented by the formula (2). A portion in the image f(x, y) which has the highest degree of matching to the respective templates is detected, and the distance of movement of the object to be monitored is calculated from the detected portion. In the step 28, whether the object to be monitored is outside of the monitor area or not is determined based on the distance of movement calculated in the step 27. That is, the distance of movement is added to the coordinates ft1(x, y) and ft2(x, y) of the first and second templates before matching to determine the coordinates tf1'(x, y) and tf2'(x, y) of the first and second templates after movement, and whether they are outside of the monitor area or not is determined. When they are outside of the monitor area, the process returns to the step 11, and when they are within the monitor area, the process proceeds to the step 29. In the step 29, whether the distance of movement derived in the step 27 is not smaller than a predetermined value or not is determined, and when it is smaller than the predetermined value, the process returns to the step 25, and when it is not smaller than the predetermined value, the process proceeds to a step 61.

In the step 61, whether the object to be monitored is within the off-limit area (area 502 in FIG. 5A) or not is determined. Namely, the coordinates ft1'(x, y) and ft2'(x, y) after movement derived in the step 28 are determined and whether they are outside of the off-limit area or not is determined.

When the object to be monitored is outside of the off-limit area, the process proceeds to a step 39 to determine a magnification factor of the template after matching. When the object to be monitored is within the off-limit area, the process proceeds to a step 62 in which the CPU 1104 applies a control signal to the output I/F 1108 through a bus 1112 to turn on the alarm lamp. In this case, the CPU may apply the control signal to the image output I/F 1109 through the bus 1112 to display alarm on the monitor 1111.

In the step 61, when one of the coordinates of the two templates after movement derived by the addition of the distance of movement is within the off-limit area, it may be determined that the object to be monitored is within the monitor area and when all of the coordinates of the two templates after movement are outside of the off-limit area, it may be determined that the object to be monitored is outside of the off-limit area. Further, when the coordinate (x', y') of the representative position J' is outside of the off-limit area, it may be determined that the object to be monitored is outside of the off-limit area.

The coordinates of the monitor area and the off-limit area are previously set in desired ranges and stored in a memory such as the work memory 1105.

After the completion of the step 62, the process proceeds to the step 39 to determine the magnification factor of the template after matching. Then, in a step 40, the positions and the sizes of the first and second templates are updated in accordance with the distance of movement calculated in the step 27 and the magnification factor determined in the step 39, and they are registered as new first and second templates ft1(x, y) and ft2(x, y). Then, the CPU 1104 applies a control signal to the camera control I/F 1107 to control the position of the camera such that the templates are positioned at substantially center of the screen.

Accordingly, in accordance with the present embodiment, the object to be monitored can be traced in a stable manner even when the distance between the object to be detected and the TV camera changes and the apparent size of the object in the input image signal changes.

In the above embodiments, the image of the detected object to be monitored is vertically divided into two parts to produce the first and second templates. Alternatively, the image of the object to be monitored may be horizontally divided into two parts to form the first and second templates depending on the shape of the object to be monitored (for example, the dimension in the x direction is longer than the dimension in the y direction).

Figure 19:
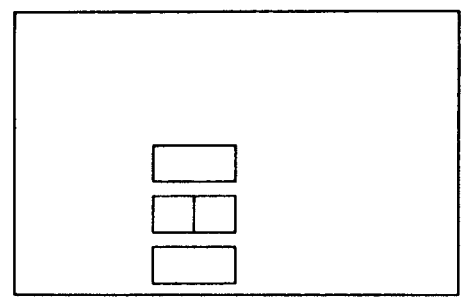
FIG. 19 shows another example of the template in the present invention.

Further, the image of the detected object to be monitored may be divided into three or more parts. As an example when the image is divided into three or more parts, it may be divided into four parts as shown in FIG. 19. In FIG. 19, an intermediate template of three templates of the same size is divided into two parts to form four templates.

As the number of templates increases, the difference between sizes of the template and the object to be monitored when the apparent size of the object to be monitored changes is reduced.

The step 63 of FIG. 7 may be added to the first to fourth embodiments, respectively.

In the second to fifth embodiments, the magnification factor of the template is determined from the change of distance in the y direction of the first and second templates because the first and second templates are arranged in the y direction although it may be determined from the change of distance in the x direction when the first and second templates are arranged in the x direction.

When a plurality of templates are arranged in the x direction and the y direction as shown in FIG. 19, the magnification factor of the template may be determined from the change of area of a rectangle which circumscribes the four templates.

Examples of display of the monitored video image in the present invention are now explained. In the present invention, since it is only needed to display the object to be monitored on the display screen in a recognizable manner, the following display styles may be adopted.

Figure 18A:
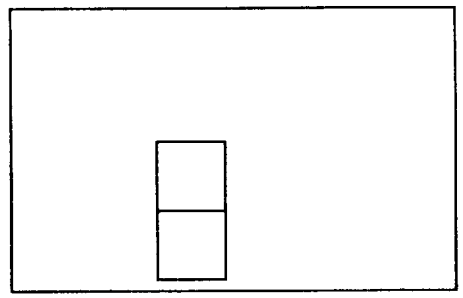
FIGS. 18A–18E show example of displays of a monitor video image in the present invention.

In FIG. 18A, only a frame of the template derived in each of the above embodiments is displayed on the monitor 1111. The template is sequentially updated as described above.

Figure 18B:
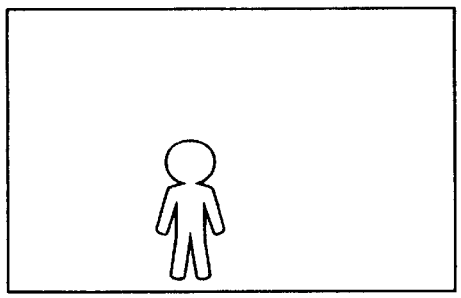

In FIG. 18B, only the object to be monitored in the input image which was matched with the template derived in each of the above embodiments is displayed.

Figure 18C:
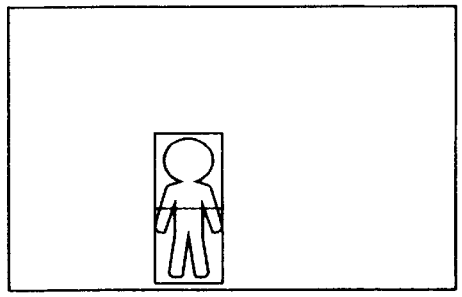

In FIG. 18C, only the frame of the template derived in each of the above embodiments and the object to be monitored in the input image which was matched with the template are displayed.

Figure 18D:
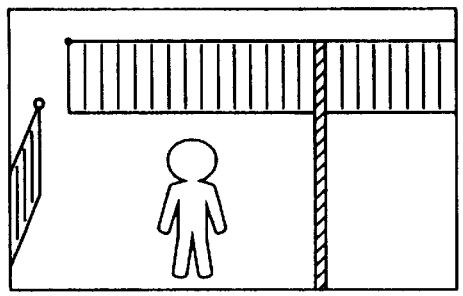

In FIG. 18D, only the background image and the object to be monitored in the input image which was matched with the template derived in each of the above embodiments are displayed. Only the background image and matched object to be monitored in the input image may be displayed, or the background image, the frame of the template and the object to be monitored in the input image which was matched with the template may be displayed.

Figure 18E:
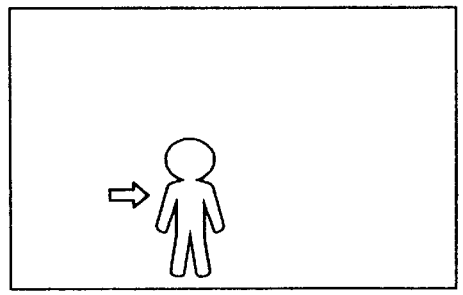

In FIG. 18E, the object to be monitored in the input image which was matched with the template derived in each of the above embodiments and a mark, for example, an arrow to facilitate the recognition of the object are displayed. Such a mark may be added to the examples of FIGS. 18A–18D.

The above examples of display are mere exemplification and various displays may be made within the scope of the present invention.

In accordance with the present invention, the problem that the previously prepared background image cannot be used because of the change of the image pick-up direction of the zoom ratio in tracing the object by using the differential method is eliminated and the object can be detected in the stable manner.

Further, since the shape of the detected object is compared for each time, the tracing of the same object is assured.

When there are a plurality of objects in the view field, the stable tracing is attained. In order to conduct the stable tracing in the pattern matching step, it is necessary in the prior art to set the TV camera at the position at which the distance between the object and the TV camera is kept constant. In accordance with the present invention, the change of the sizes of the template image and the input image which occurs when the distance between the object to be detected and the TV camera changes and the apparent size of the object on the input image signal changes, is reduced by dividing the template to be used in the template matching into a plurality of parts so that the matching can be conducted in the stable manner. Further, the change of the apparent size of the object is calculated from the change of the distance between the templates on the image and the templates are sequentially updated so that the stable matching is attained.

Accordingly, in accordance with the present invention, the restriction in the prior art to the setting position relation of the object to be monitored and the TV camera, the object may be traced in the stable manner and the range of application of the video image monitoring system is expanded.

In the present invention, by displaying the frame of the template on the screen as shown in FIG. 10F, the operator may readily recognize the object to be monitored and conduct the tracing in a positive manner.

What is claimed is:

1. A video image monitoring method for monitoring an object to be picked up by image pick-up means, comprising:
   a first step for producing a difference between an input image and a background image, in order to obtain the image of said object, said input image including said background image and the image of said object to be monitored from said image pick-up means;
   a second step for dividing the image of said object into a plurality of parts to produce a plurality of divided images of said object, each of which is a template;
   a third step for matching each of said templates with a new input image and detecting a plurality of parts of said new input image having highest degrees of matching with said templates; and
   a fourth step for updating said templates using said parts of said new image having said highest degrees of matching as a plurality of new templates, wherein said fourth step is sequentially executed for new input images to sequentially update said templates to trace said object.

2. A video image monitoring method according to claim 1 wherein said fourth step comprises:
   a step for determining a difference of coordinates on a display between said templates and said new templates derived in said fourth step in order to obtain a distance of movement of the object to be monitored; and
   a step for adding the distance of said movement to the coordinates of said templates to produce said new templates.

3. A video image monitoring method according to claim 1 wherein said fourth step comprises:
- a step for determining a difference of coordinates on a display between said templates and said new templates derived in said fourth step, in order to obtain a distance of movement of said object to be monitored;
- a step for determining a ratio of the distances between further new templates in a further new input image and said new templates derived in said fourth step, relative to the distance between said further new templates; and
- a step for adding the distance of said movement to the coordinates of said templates to determine the positions of said new templates and updating the sizes of said templates based on said ratio to produce said new templates.

4. A video image monitoring method according to claim 3 further comprising a fifth step for determining the distance between said object to be monitored and said image pick-up means in accordance with said ratio derived in said fourth step.

5. A video image monitoring method according to claim 4 further comprising:
- a sixth step for controlling a zoom ratio of said image pick-up means in accordance with the distance between said object to be monitored and said image pick-up means derived in said fifth step.

6. A video image monitoring method according to claim 1 further comprising:
- a seventh step for displaying at least one of frames of said new templates updated in said fourth step and the images of said parts of said new image derived in said fourth step on a display of a display device.

7. A video image monitoring system comprising:
- a TV camera for picking up an image of at least monitor area;
- an image input interface for receiving an image signal from said TV camera;
- processing means including a microprocessor and a memory for processing the image signal from said image input interface; and
- a display device including a display screen, wherein said processing means comprises:
- first means for producing a difference between an input image from said TV camera and a background image, said input image including said background image from said TV camera and an image of the object to be monitored, in order to obtain the image of said object,
- second means for dividing the image of said object into a plurality of parts to produce a plurality of divided images of said object which are a plurality of templates,
- third means for matching each of said templates with a new input image from said TV camera and detecting a plurality of parts of said new input image having highest degrees of matching with said templates, and
- fourth means for updating said templates using said parts of said new input image having said highest degrees of matching as a plurality of new templates, wherein said fourth means causes sequential updating of said templates with respect to new input images to conduct tracing of said object.

8. A video image monitoring system according to claim 7 wherein said fourth means comprises:
- means for determining a difference of coordinates on said display between said templates and said new templates in order to obtain a distance of movement of said object to be monitored; and
- means for adding the distance of said movement to the coordinates of said templates to produce said new templates.

9. A video image monitoring system according to claim 7 wherein said fourth means comprises:
- means for determining a difference of coordinates on a display between said templates and said new templates by said fourth means to obtain a distance of movement of said object to be monitored;
- means for determining a ratio of the distances between further new templates in a further new input image and said new templates derived by said fourth means, relative to the distance between said further new templates; and
- means for adding the distance of said movement to the coordinates of said templates to determine the positions of said new templates and updating the sizes of said templates based on said ratio to produce said new templates.

10. A video image monitoring system according to claim 9 further comprising fifth means for determining the distance between said object to be monitored and said image pick-up means in accordance with said ratio derived by said fourth means.

11. A video image monitoring system according to claim 10 further comprising:
- sixth means for controlling a zoom ratio of said image pick-up means in accordance with the distance between said object to be monitored and said image pick-up means derived by said fifth means.

12. A video image monitoring method according to claim 7 further comprising:
- seventh means for displaying at least one of frames of said new templates updated by said fourth means and the images of said parts of said new image derived by said fourth means on said display.

13. A video image monitoring method for monitoring an object to be picked up by image pick-up means, comprising:
- a step for producing a difference between a background image and an image of said object to be monitored from an image from said image pick-up means;
- a step for dividing the image of said object into a plurality of parts to produce a plurality of templates of said object; and
- a step for matching each of said templates with a new input image and updating said templates into a plurality of new templates which match with said new input image, wherein said steps are sequentially executed for new input images to sequentially update said templates to trace said object.

* * * * *